United States Patent [19]
Metcalfe et al.

[11] 3,988,913
[45] Nov. 2, 1976

[54] ISOTHERMAL METAL FORMING APPARATUS

[75] Inventors: Arthur G. Metcalfe, San Diego; Fred K. Rose, Chula Vista, both of Calif.

[73] Assignee: International Harvester Company, San Diego, Calif.

[22] Filed: Feb. 28, 1975

[21] Appl. No.: 553,998

Related U.S. Application Data

[60] Division of Ser. No. 484,307, June 28, 1974, Pat. No. 3,944,782, which is a continuation-in-part of Ser. Nos. 227,683, Feb. 18, 1972, Pat. No. 3,823,299, and Ser. No. 426,564, Dec. 20, 1973, abandoned, which is a continuation-in-part of Ser. No. 226,570, Feb. 16, 1972, abandoned, said Ser. No. 227,683, and Ser. No. 226,570, each is a division of Ser. No. 856,526, Sept. 8, 1969, Pat. No. 3,644,698.

[52] U.S. Cl. .................................. 72/69; 72/202; 72/342; 219/152
[51] Int. Cl.² ................. B21B 27/10; B21D 37/16; B21H 1/06
[58] Field of Search ............... 72/69, 200, 202, 342, 72/364, 250, 251; 29/132; 219/83, 100, 117, 118, 149–154

[56] References Cited
UNITED STATES PATENTS

| | | | |
|---|---|---|---|
| 939,167 | 11/1909 | Sack | 72/244 X |
| 1,025,078 | 4/1912 | Vassen | 72/225 |
| 1,347,917 | 7/1920 | Sheperdson | 72/234 X |
| 2,380,067 | 7/1945 | Patterson | 72/247 |
| 3,228,220 | 1/1966 | Schneckenburger | 72/250 X |
| 3,577,619 | 5/1971 | Strandel | 29/132 |
| 3,584,490 | 6/1971 | Bindernagel | 72/224 |
| 3,609,849 | 10/1971 | Krol | 29/132 |
| 3,686,911 | 8/1972 | Plagemann et al. | 72/69 |

FOREIGN PATENTS OR APPLICATIONS

| | | | |
|---|---|---|---|
| 440,436 | 2/1927 | Germany | 72/202 |
| 14,069 | 8/1967 | Japan | 72/250 |
| 283,161 | 10/1970 | U.S.S.R. | 72/200 |

*Primary Examiner*—C.W. Lanham
*Assistant Examiner*—E. M. Combs
*Attorney, Agent, or Firm*—Strauch, Nolan, Neale, Nies & Kurz

[57] ABSTRACT

Metal forming methods in which a workpiece is heated and subjected to pressure, causing the metal to become plastic and flow into a selected configuration. Apparatus in which the method can be carried out and tooling for use in the methods and apparatus.

22 Claims, 47 Drawing Figures

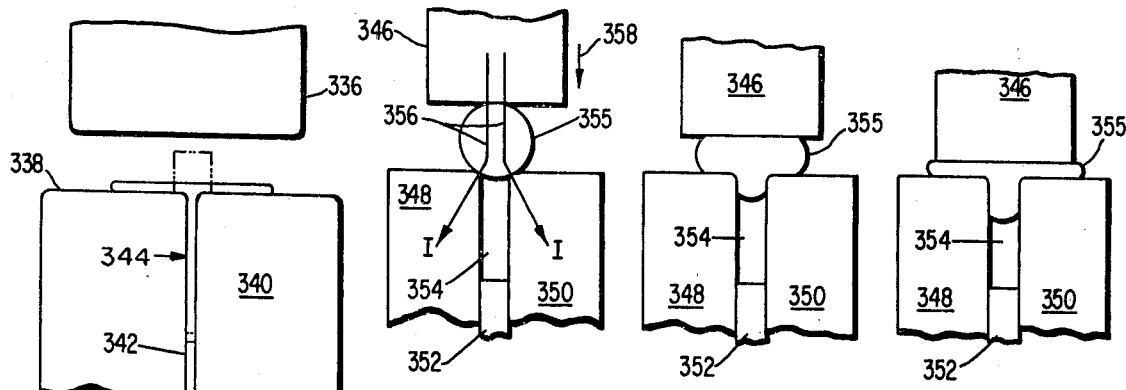
FIG.25 FIG.26A FIG.26B FIG.26C
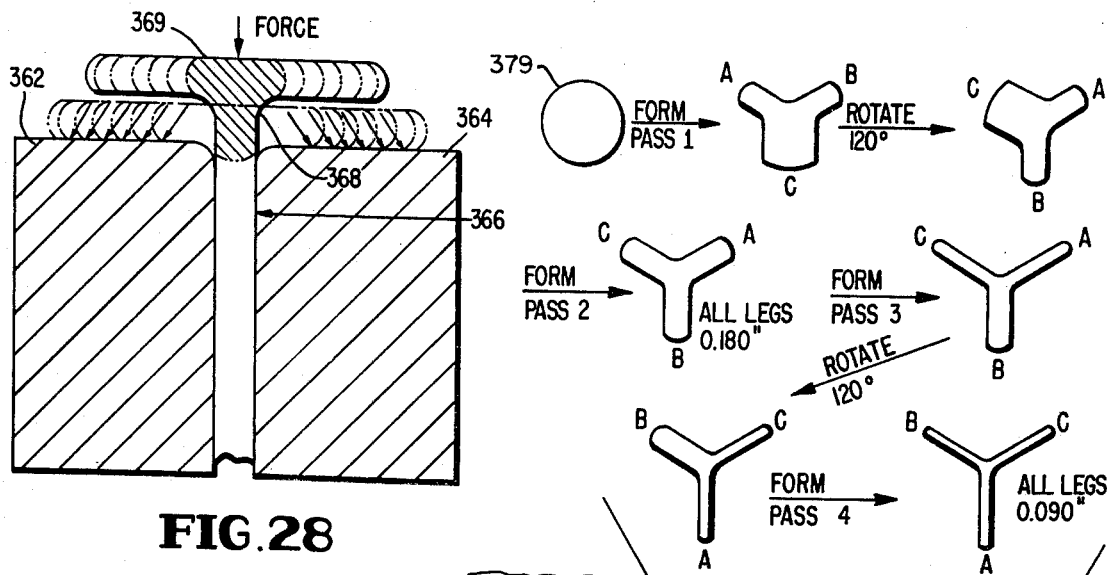
FIG.28 FIG.31
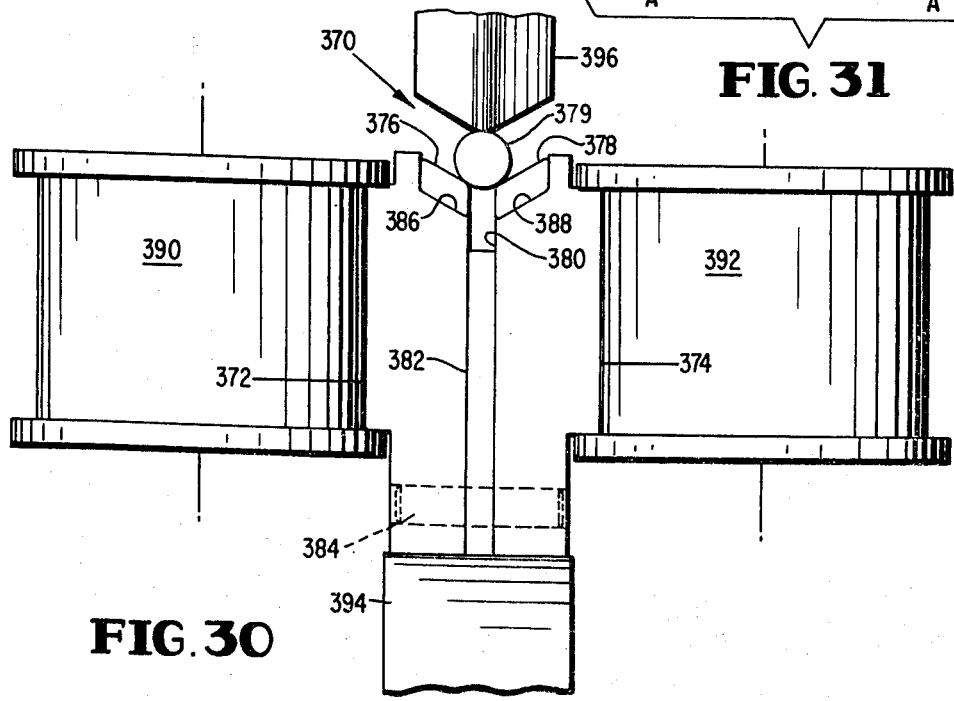
FIG.30

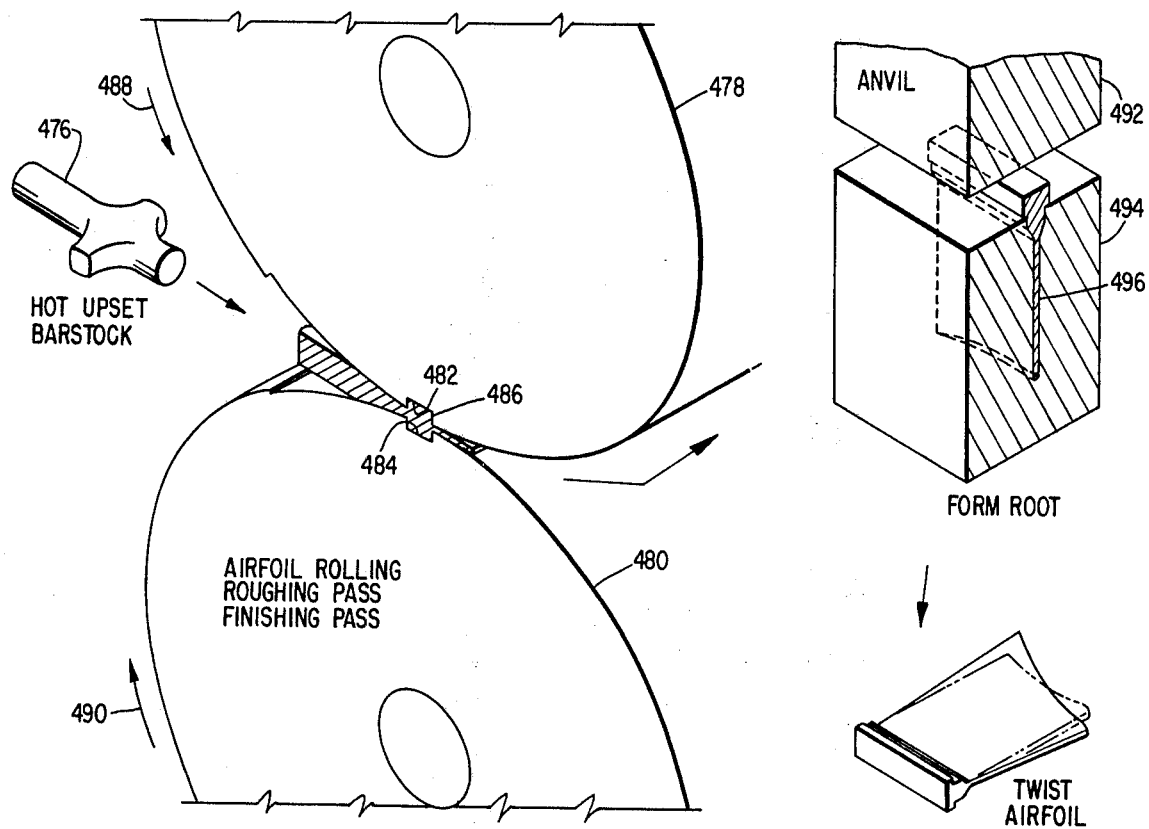
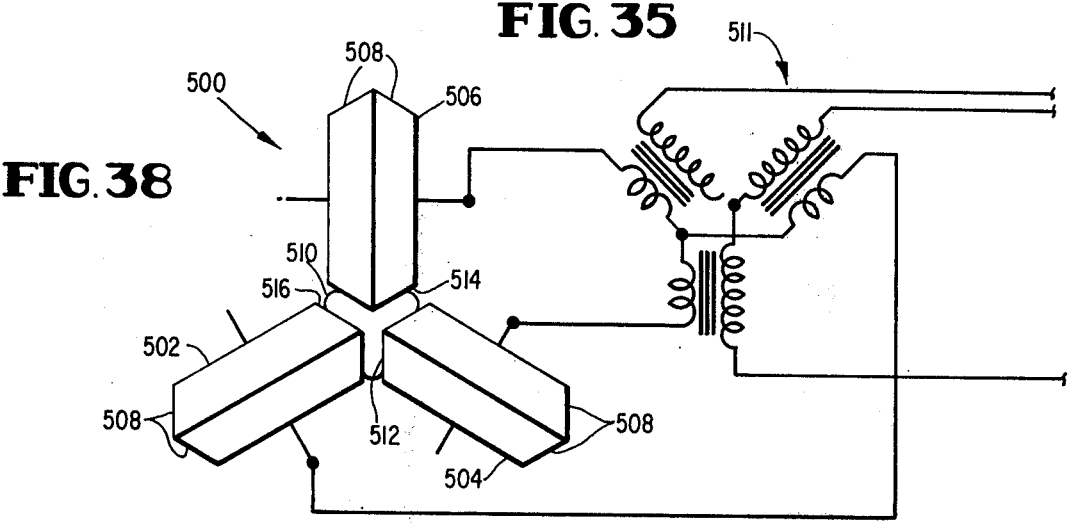
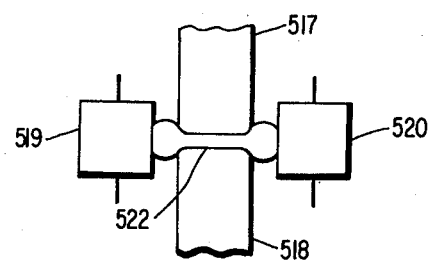
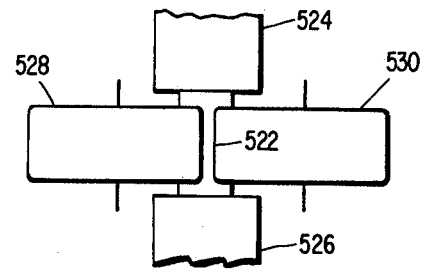

ISOTHERMAL METAL FORMING APPARATUS

This application is a division of application No. 484,307 filed June 28, 1974, now U.S. Pat. No. 3,944,782 which is a continuation-in-part of applications Nos. 426,564 filed Dec. 20, 1973 (now abandoned), and 227,683 filed Feb. 18, 1972 (now U.S. Pat. No. 3,823,299). Application No. 426,564 is a continuation of application No. 226,570 filed Feb. 16, 1972 (now abandoned). Applications Nos. 227,683 and 226,570 are divisions of application No. 856,526 filed Sept. 8, 1969 (now U.S. Pat. No. 3,644,698).

The present invention relates to the shaping of metals and, more particularly, in one aspect to novel improved methods for forming metals which are difficult to process by conventional methods as well as those more readily formed metals. The term "metal," as used herein, includes both elemental metals and alloys unless indicated otherwise.

Numerous methods for the solid state forming of metallic workpieces into selected shapes have heretofore been proposed. These include: rolling, forging, certain types of welding, piercing, drawing or cupping, spinning, and extrusion.

Of the foregoing, various forging techniques in which the metal is worked at an elevated temperature are widely used with roll forging playing a prominent role because the shaping proceeds in a continuous fashion. Roll forging can accordingly be employed to impart selected shapes to workpieces of indefinite length.

In the typical forging operation, the workpiece is preheated to forging temperature and then shaped with a hammer, press, or rolls. This process is useful for forming weak and ductile materials such as steel but becomes less and less useful as the strength and/or brittleness of the workpiece metal increases.

First, the preheating causes oxidation, scaling, or sub-surface contamination or a combination of these effects. All are undesirable. They can reduce the ability of the workpiece to undergo deformation and, at the very least, result in parts that are rough and/or scaled to the extent that overall machining may be required to produce an acceptable finish.

Another disadvantage of conventional forging processes as far as the forming of other than ductile metals is concerned is that the workpiece cools while it is transferred from the preheating furnace to the forging machine. The cooling or chilling of the workpiece accelerates when it contacts the dies, rolls, and other forming tools of the forging machine. Typically, the total cooling of the workpiece will be so extensive that the temperature at which the workpiece is actually worked will be as much as 500° F. below the temperature at which the workpiece leaves the preheating furnace.

This cooling of the workpiece may reduce its plasticity to the point where the workpiece cannot be formed without cracking or similar deterioration. And, even if this does not occur, the pressures required to deform the workpiece can become so high that cracking of or other damage to the tools and/or other components of the forging machine becomes likely. Also, even with high pressures, the amount of deformation that can be produced is so small that the process becomes economically unattractive at best.

Another hot forging process heretofore proposed is electrical resistance hot upsetting with conventional unheated forging rolls. This process, disclosed in U.S. Pat. No. 2,813,194 issued Nov. 12, 1975; to R. B. Stermon for UPSETTING MACHINE, is expressly characterized as being useful for forming "ductile material".

The art recognizes that the Stermon process is not useful for forming harder, more difficult-to-work materials. In U.S. Pat. No. 2,922,014 issued Jan. 19, 1960, to V. W. Green for HIGH FREQUENCY INDUCTION HEATING AND ROLL FORGING OF METAL WORKPIECES, the patentee discusses several disadvantages of the Stermon process and points out that it is not of value where hard-to-work metals are involved.

The reasons that the Stermon process cannot be used to form hard-to-work metals are manifest from an inspection of the forging apparatus disclosed in his patent. Heat is extracted from the workpiece by the forging rolls, reducing its temperature; and the workpiece becomes too hard to be shaped.

The Stermon process is also unusable to shape hard metals and alloys because, as the edge of the workpiece is upset, the metal flows into contact with upset limiting blocks and because the rest of the workpiece is unheated and, also, in thermal contact through electrical conductors with massive, unheated die blocks (materials having low ohmic resistance are good thermal conductors). The die blocks, conductors, and upset limiting blocks would chill the edges of a hard, non-ductile metal workpiece to such an extent that it could not be satisfactorily shaped, even if it were not chilled to an unacceptable extent by the forming rolls.

The development of harder and higher strength materials since Stermon's day has been paralleled by a search for techniques which can be used to form them. One technique is proposed in the Green patent identified above, a more recent one in U.S. Pat. No. 3,250,104 issued May 10, 1966, to Fischer for High-Temperature Rolling Mill.

Fischer's process involves preheating the workpiece to forming temperature and then shaping it with rolls heated by gas-fired or electric heaters adjacent the rolls. The rolls are covered with a carbide, boride, or oxide to make them heat resistant.

The Fischer process is not without its drawbacks. The preheating step produces surface contamination. This rules out the process for applications where thin gauge metals or thin sections are involved.

Also, the long time at high temperature which preheating entails causes grain growth and/or other changes in the microstructure of the workpiece material. Such changes are undesirable because they weaken or otherwise adversely effect the physical properties of the material.

In addition, preheating involves workpiece contact with an oxidizing environment while the workpiece is at an elevated temperature. This decreases the ductility of many metals by general subsurface contamination or by grain boundary oxidation. Metals in the first category include titanium, zirconium, columbium, and others. In the second category are nickel-based alloys such as Rene' 95 and other materials.

The search for better techniques of forming harder metallic materials has accordingly continued, culminating in the present invention.

In our novel process the workpiece is formed with a relatively small, forming roll (or other tool in certain applications) made from a refractory metal or refractory alloy that is, a metallic material having a melting point above the range of iron, cobalt, and nickel. Electrical current is passed from the forming tool through the workpiece to the workpiece support. This results in that peripheral region of the forming roll or electrode in contact with the workpiece tending to reach incandescent temperatures as does the workpiece. Accordingly, an isothermal condition between the electrode and the workpiece is approached; and the workpiece remains hot until the forming is completed rather than being chilled as it is by the forming tools in conventional processes. While the forming tool does not reach precisely the same temperature as the workpiece, the temperature difference is small enough that heat does not flow into the forming tool at a high enough rate to significantly reduce the temperature of the workpiece, let alone chill it.

Because they are not chilled by the forming electrode in the process, even the hardest alloys can be heated to plasticity and kept plastic until they are deformed to the desired shape.

Also the absence of chill makes the force required to produce a given per pass percentage of reduction in the thickness of the workpiece independent of workpiece thickness (the requisite force may even decrease as the thickness of the workpiece is reduced, a benefit of obvious importance). In contrast, in conventional hot rolling the roll forces required to produce a given degree of deformation may increase to unattainably high levels even where the thickness of the workpiece is reduced to an order of magnitude greater than the thickness of workpieces which can easily be formed by using our novel process.

Another important advantage of our process is that surface contamination is not a problem. This is because preheating is in general not required. And, if preheating is employed, the workpiece will typically be heated to only a moderate temperature, not to the forming temperature as in prior forming methods.

Although in general not essential, preheating of the workpiece can in some instances be used to advantage in our process. Preheating of the workpiece can, for example, be used to reduce the force required for deformation of the workpiece. Preheating of the forming tool ahead of the point of contact with the workpiece may also sometimes be employed to advantage in conjunction with preheating of the workpiece.

Because the workpiece is cold if preheating is not employed, maximum pressure may be exerted on the workpiece upon first contact by the forming roll, this pressure decreasing as the temperature increases and the workpieces becomes more plastic. Because of this relation of the highest pressure area to workpiece plasticity, the force promoting rejection of the part can become high enough to necessitate force feed.

Another reason for employing preheat is that, in certan instances, some deformation of the workpiece occurs as much as one inch ahead of the location where the forming tool and the workpiece make contact. Preheat can reduce the resistance to deformation in this area and, also, minimize the temperature gradient in the workpiece, preventing cracking in the workpiece area ahead of the forming roll.

In a typical application in which preheating is employed, the temperature of the workpiece will be increased from room temperature to 1200° F. over a period of 60 seconds at which point it will be contacted by the forming tool, causing the workpiece temperature to increase an additional 600° F. in 1 second. The workpiece reaches a temperature as high as 1000° F. only in the final 10 seconds of the preheat period. Surface contamination under these conditions is insignificant.

Furthermore, the workpiece remains at elevated temperatures for only short periods of time during the actual forming step. And the portion of the workpiece which is formed is isolated from the surrounding environment by the forming tool before it reaches a temperature high enough to cause any problems and remains so isolated until it has begun to cool. At the same time the higher temperature peripheral portions of the forming tool are isolated from the ambient surroundings, protecting the forming tool against oxidative deterioration. As a result, no significant surface contamination is produced in the forming step; and surface finishes as good as 16–32 rms have consistently been achieved in forming a variety of metals.

"Rms" is a well-recognized measure of the roughness of a surface. In the technique of evaluating surface finishes which produces results in this system a sensitive stylus is displaced across the surface of a component. Typically, the stylus is electrically connected to apparatus which periodically measures the deviation from the nominal surface detected by the stylus. These values are squared to eliminate pluses and minuses and summed. The square root of the sum is then taken, producing an average indicative of variations in the surface.

If surface cleanup is employed at all, it will typically be an inexpensive and straightforward procedure such as bead blasting, possibly followed by a chemical cleanup step if an optimum surface finish is required.

In contrast, parts formed from hard-to-work metals by other processes such as extrusion may require overall machining to minimum depths of as much as 0.03–0.06 inch to produce an acceptable surface condition. In fact, the amount of machining required may be so great the final component weighs as little as 10% of the weight of the original extrusion, casting, etc., the remaining 90% of the original material being turned into scrap.

Because the workpiece is heated for only short periods of time (measured in seconds) and because large amounts of deformation are generally involved (up to 100%), the grain size of the workpiece metal does not increase during applicants' forming process. In many cases, grain size is actually reduced because of the large amount of deformation. This grain size reduction is a decided benefit.

Such cycles may also be used to advantage in high temperature beta processing of titanium and its alloys, especially those of the alpha-beta type (beta processing is the working or shaping of titanium or a titanium alloy at a temperature at which the structure is in the beta phase; that is, has a body centered, cubic lattice). The advantages of beta processing including increased fracture toughness and ultimate shear strength have long been recognized. Processing in the beta region has generally been avoided, however, because of the continued exposure of the metal to temperatures above the beta transus heretofore involved in beta processing, particularly in the preheat step. This causes grain growth and requires large amounts of deformation (50 percent or more) throughout the workpiece section to avoid loss of ductility.

We have, in contrast, successfully formed titanium alloys at temperatures as high as 2100° F., which is well above the beta transus, without grain growth, producing parts having all the benefits attainable by beta forging without the disadvantages attributable to an increase in grain size and the loss of ductility which occurs when titanium is held at temperatures above the beta transus for appreciable periods of time.

Advantages flowing from the short heating cycle are not confined to the processing of titanium alloys. Because of its inherent characteristics and the process controls available, our process is in general capable of generating microstructures and associated beneficial properties that cannot be obtained by conventional techniques. This is particularly true in the case of superalloys.

For example, Inconel 718 has been formed at temperatures of 2050° ± 25° F. without adversely affecting the mechanical properties of the alloy. If Inconel 718 were held at this temperature in a furnace for any appreciable time, there would be complete solution and excess grain growth resulting in marked deterioration of the mechanical properties of the alloy (1800° Fahrenheit is the maximum temperature to which this alloy can be subjected for any appreciable length of time without seriously affecting its properties).

A further advantage of our process is that the spreads between the yield strengths and elastic moduli of the forming tool and the workpiece increase as the workpiece temperature increases. As a result, roll flattening is reduced to an insignificant level. Because of this and the lack of surface and subsurface contamination, workpieces can be formed to much thinner guages than has heretofore been possible. We have, for example, formed airfoil sections with razor-sharp edges and have thinned sections of structural shapes to thicknesses of less than 0.005 inch with rolls more than 12 inches in diameter.

That such thin sections can be formed by our novel process is a result which would be entirely unexpected by those familiar with conventional metal rolling technology.

Although we do not wish to be bound by any particular theory, we believe that the reason our process is capable of producing such thin sections is that the localized heating of the forming roll produces a thermal buldge on the periphery of the roll which offsets the usual roll flattening that occurs when one attempts to roll thin sections. Other important contributing factors are the high yield strength and elastic modulus of the forming roll relative to the workpiece.

Also, again because the workpiece remains at an elevated temperature for only a short period of time, even relatively reactive metals can be formed in air with only negligible surface contamination. This eliminates the heretofore present need for forming the workpiece in a vacuum or inert gas atmosphere and the attendant trouble and expense.

Another advantage of the process is that tight tolerances can be maintained with excellent surface finishes. Dimensions are reproducible to 0.010 inch or less, even in components formed from sheet material, which is much better than is possible in conventional sheet metal components. Accordingly, machining of the formed part is minimized or even eliminated as it is required only where a dimension of the part is particularly critical.

Furthermore, parts with non-uniform sections and/or irregular contours can be readily formed by our novel process. And design changes pose no problems because the tooling employed in our process is relatively inexpensive.

Another advantage of our process is that both internal and external radii approaching zero can be produced, even in the most difficult-to-form materials (internal radii can be even further reduced, if desired, by a shaving or other ancillary step). This is also important because of the reduction of material required and the concomitant cost, weight, and space savings.

Even by employing the expensive creep forming process, the minimum radius bends that can be made in titanium alloy sheet are three times the thickness of the sheet. Because of this industry now uses machined rather than formed sheet parts to obtain square corners even though the cost is several times higher. Of course such cost can be justified only in exceptional circumstances, a factor which has led to decreasing use of titanium in aircraft and resultant weight penalties.

The foregoing benefits can be realized because components formed from sheet material in accord with the present invention are structurally more efficient than conventional sheet metal products. Stress concentrations are lower, permitting higher design stresses and therefore thinner gauges or smaller sections to be employed.

The weight savings can be as high as 17 percent for titanium alloys; and, at the same time greater stiffness and fatigue resistance can be obtained.

Another desirable characteristic of our process is the very small axial elongation of the workpiece in the forming step (typically on the order of 0.07 inch per foot). This makes the process readily adaptable to multi-stand operation. Successive stands can be operated at equal speeds with the slight thermal growth being accommodated by axial compression of the workpiece between subsequent forming stages or by lubricating the workpiece so that it can slip relative to the forming rolls in subsequent stages.

Yet another highly important advantage of our novel process is that the metal of the workpiece is caused to flow into "streamlined" contours in the areas in which forming occurs, even where bending of the workpiece is involved. ("Streamlining" is employed herein to designate an external configuration of a part or component where the transition from one surface to another is not by a radius tangent to the surfaces, but occurs at a rate which is initially infinitesimally slow and continues at an increasing rate to a location half-way through the transition from one to the other of the two surfaces). This is important because of the low stress concentrations and very good resistance to fatigue which results, again permitting the weight of the component to be reduced significantly from that required for the same component manufactured by currently employed techniques.

Complementing the high fatigue resistance are high shear and tensile strengths and fracture toughness, which also permit a reduction in weight and size as well as a cost reduction due to the lesser amount of material which is needed.

Yet another advantage of our novel process is that the workpiece temperature can be very precisely controlled. This is particularly important in forming superalloys and materials with similar properties because alloying to increase strength decreases the melting point of the alloy, limiting the range between the temperature at which the metal can be formed and the solidus temperature. An example is Inco 713C, which can be formed only if the temperature of the workpiece is within 50°–100° F. of the solidus temperature.

At the same time the deformation rate can be kept low enough to form materials such as that just mentioned. In contrast, the requirement that the deformation rate be low keeps such materials from being formed by processes such as hot rolling where high deformation rates must be employed to minimize chilling as much as possible.

Furthermore, even with metals which are more readily formed than the superalloy just described, the high strain rate resulting from the fast working rates required in conventional processing can cause cracking to occur, even through the flow stress may be within acceptable limits. Thus, our process is also advantageous in the processing of materials of this character.

A related advantage of our novel process is that it is to a certain extent self-regulating. Increased temperatures in the workpiece reduce the flow stress, increasing the flow of metal. This increases the contact area, producing lower current densities in the workpiece and, therefore, lower workpiece temperatures. Self-regulation occurs in the opposite direction upon decreases in the workpiece temperature.

Yet another advantage of our invention which is important for self-evident reasons is that its principles can be utilized to produce shapes and sections which have not heretofore been available.

Stress relief of the formed component to eliminate residual stress, bowing or overforming may be required but is easily accomplished. Heating the workpiece for 1 hour at 1300°–1750° F. and preferably for 2 hours at 1350° F. has been found satisfactory for stress relieving titanium alloys such as Ti-6Al-4V, and 30 minutes at 2150° F. is suitable for superalloys such as Inconel 718.

The component can be constrained in a jig or fixture (not shown) during the stress relieving step to insure that the stress relieved component is free of camber, has its different sections in the correct angular relationship, or is otherwise in the proper configuration. The constraint may be partial or complete, depending upon the application of the invention.

The machines in which our process is carried out are also available at a comparatively low cost because forming pressures are low in comparison to those employed in processes such as hot rolling and because larger per pass reductions can be obtained.

Because forming pressures are significantly lower, the equipment is also less massive than conventional hot rolling mills and the like. This is another obvious advantage of our process from the standpoint of manufacturing economics.

Due to the foregoing and other of the attributes of our novel process discussed above, a variety of components can be formed at a fraction of the current cost of making them.

A perhaps related advantage is that the cost of the tooling used in our process is relatively low. This is important from the cost standpoint and because it eliminates the constraint on design changes imposed by more expensive tooling.

Among the metals we have successfully formed by our novel process are 1018 mild steel, A70 titanium, beryllium, Ti-6Al-4V, Hastelloy X (Co 1.5, Cr 22, Mo 9.0, W 0.6, Fe 18.5, C 0.1, balance Ni), Inconel 713C (C 0.14, Cr 13.0, Mo 9.5, Ti 0.75, Al 6.0, Cb+Ta 2.3, balance Ni), Rene' 95 (Cr 14.0, Co 8.0, Mo 3.5, W 3.5, Cb 3.5, Ti 2.5, Al 3.5, balance Ni), Inconel 718 (C 0.04, Mn 0.20, Fe 18.0, Cr 14.0, Al 0.60, Ti 0.80, Cb 5.2, Mo 3.0, balance Ni), 17-4PH (C 0.07, Cr 16.5, Ni 4.0, Cu 4.0, Cb+Ta 0.30, balance Fe), Ti-6Al-6V-2Sn, and T321 and 18-8 stainless steels.

We have successfully demonstrated the applicability of our process to the forming of T, Y, I, and E sections from barstock and milled blanks and Z and channel sections and flanged cylinders among others from sheet material. We have also successfully shown that our novel process can be used for other forming operations such as straightening elongated structural shapes and shaping both the airfoil and root sections of turbine compressor blades.

Several of the shapes we have formed have been produced in a continuous manner rather than in discrete lengths.

One primary object of the present invention resides in the provision of novel, improved methods for forming metallic workpieces into components of selected configuration.

Other important but more specific objects of the invention reside in the provision of processes in accord with the preceding object:

1. which can be employed to form hard, brittle, difficult-to-work metals and alloys that can be shaped only with difficulty, if at all, by conventional metal forming processes;

2. which, in conjunction with the preceding object, can also be employed to form those more ductile metals which are amenable to shaping by conventional processes;

3. which can be employed to produce metallic components with properties and/or configurations which have not heretofore been available;

4. which can be employed to produce metallic cmponents at lower cost than can be done by competitive processes;

5. which, in conjunction with the preceding object, are capable of forming metallic workpieces into components equivalent to those heretofore available only by the much more expensive process of machining the component from barstock or a forging or extrusion or the like;

6. which are capable of producing larger amounts of deformation of the workpiece per pass than can typically be achieved by heretofore available processes;

7. which are capable of forming workpieces of thinner gauge and of forming workpieces to thinner sections than is possible by heretofore available hot working processes;

8. which are capable of producing better surface finishes than prior art hot working processes;

9. which are capable of producing closer dimensional tolerances than heretofore available sheet metal forming processes;

10. which eliminate the need for preheating the workpiece to forming temperature;

11. in which the forming tool does not chill the workpiece during the forming step;

12. in which the workpiece material remains at forming temperature for only a short period of time;

13. which are capable of forming metals without adversely affecting their physical or mechanical properties or with an actual improvement in such properties;

14. in which that portion of the forming tool in contact with the workpiece is heated to a temperature approaching the highest workpiece temperature by causing a flow of electrical current from the forming tool through the workpiece to a workpiece support; 15. which are capable of reducing the metal loss by removal from the workpiece to a small fraction of the loss encountered in making components of difficult-to-work metals by machining them from stock shapes or from extrusions or castings or the like;

16. which eliminate the need for carrying out the forming step in vacuo or in an inert gas atmosphere even if the workpiece is of a reactive metal but in which a protective atmosphere or vacuum can be employed, if desired;

17. which are capable of making components that cannot be made economically by heretofore available techniques including components with non-uniform sections and irregular contours;

18. which are capable of making components which are structural equivalents of but weight substantially less than comparable components made by heretofore available techniques;

19. which are readily adaptable to multi-stand operation;

20. which can be readily employed to form components of indeterminate as opposed to finite length;

21. which minimize and even eliminate the need for post-forming heat treating procedures such as stress relieving, etc.;

22. which can be carried out in equipment that is available at relatively low cost and is of comparatively small size;

23. which employ relatively low cost tooling;

24. which make design changes feasible to a greater extent than has heretofore been the case;

25. which can be used to form components with nonuniform or irregular configurations as well as components of complicated configurations such as turbine blades;

26. which have various combinations of the desirable attributes listed in the preceding objects.

In another aspect our invention relates to the provision of novel, improved apparatus in which the metal forming processes discussed above can be carried out; and it is a further object of the invention to provide apparatus of that character.

Related but more specific objects of the invention reside in the provision of apparatus in accord with the preceding object:

27. which is capable of carrying out a wide variety of forming operations including, but not limited to, square bending, spreading, forward and backward extrusion, levelling and straightening;

28. in which provision is made for applying front tension or force feed or both of the foregoing to the workpiece being formed;

29. which can be employed to form workpieces of indefinite length;

30. in which, in conjunction with the preceding object, the need for linear, workpiece constraining or supporting tooling is eliminated;

31. which are adaptable to multi-stand manufacturing operations;

32. in which there is only localized heating of the workpiece being formed and in which the forming conditions can be closely controlled;

33. which are capable of preheating the workpiece to a selected temperature in applications where preheat can be used to advantage;

34. which can be employed to form complex shapes such as, by way of example only, the airfoil and root sections of turbine compressor blades.

35. in which, in conjunction with the preceding object, a configuration which it is desired to impart to the workpiece is provided on a workpiece contacting portion of the forming tool;

36. in which the flow of heat from the workpiece being formed into the forming tool is drastically lower than in conventional hot forming machines such as rolling mills;

37. which have a novel system for guiding the workpiece being formed into working relationship with the forming tool or tools;

38. which can be employed for forming both sheet or plate type workpieces and barstock;

39. which are capable of producing heretofore unattainable reductions in difficult to work metals including, but not limited to, superalloys, titanium alloys, an the like;

40. which have various combinations of the foregoing attributes.

In yet another aspect our invention resides in the provision of novel, improved tooling for use in the metal forming processes and apparatus we have invented; and it is a further object of our invention to provide tooling of this character.

Other important objects of the invention reside in the provision of such tooling, which:

41. is durable and has a relatively long service life, even in demanding applications such as the forming of superalloys;

42. which can be used to produce components with close dimensional tolerances;

43. which is relatively inexpensive;

44. in which, in conjunction with the preceding object, only an insert need be replaced when the tooling becomes unacceptably worn;

45. which is free of distortion at the temperature it reaches in the forming process;

46. which will not stick to the workpiece being formed;

47. which has various combinations of the attributes identified above.

Further important objects and advantages and additional novel features of our invention will become apparent from the appended claims and as the ensuing detailed description and discussion proceeds in conjunction with the accompanying drawing, in which:

Figure 3:
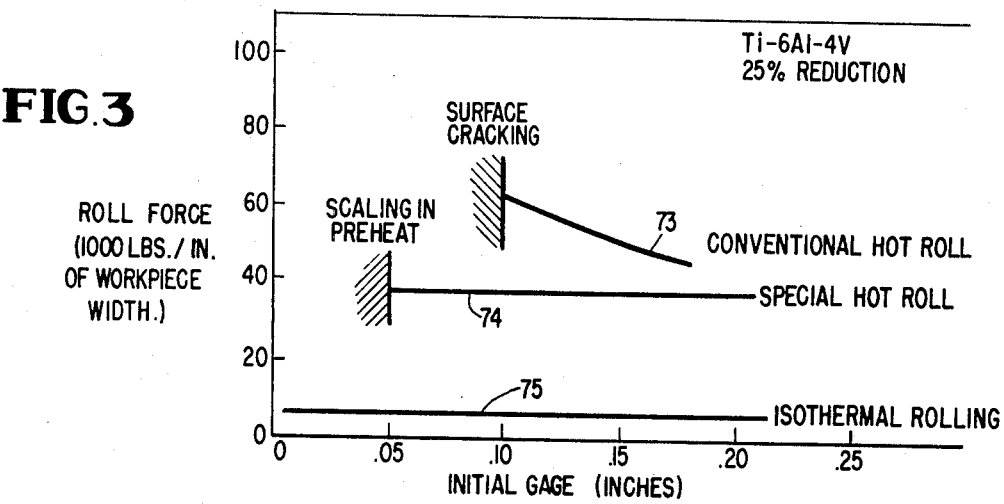
Figure 4:
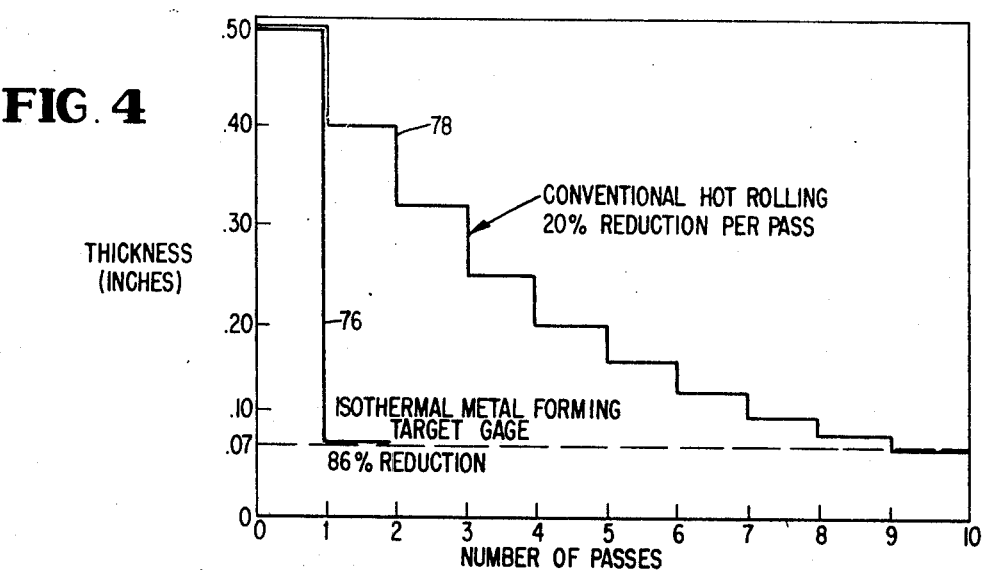
Figure 6:
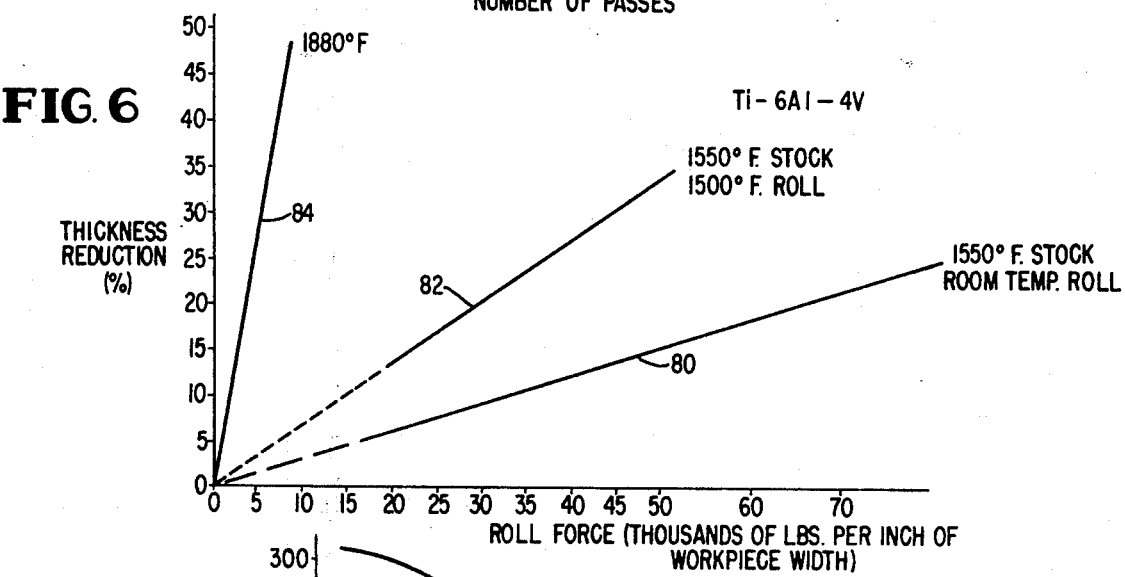
Figure 7:
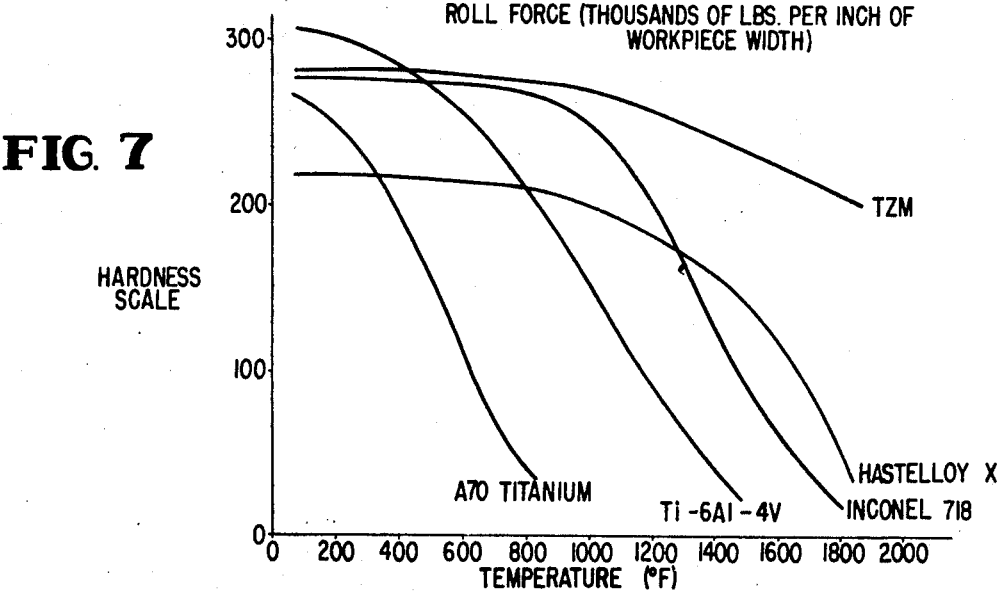
Figure 5:
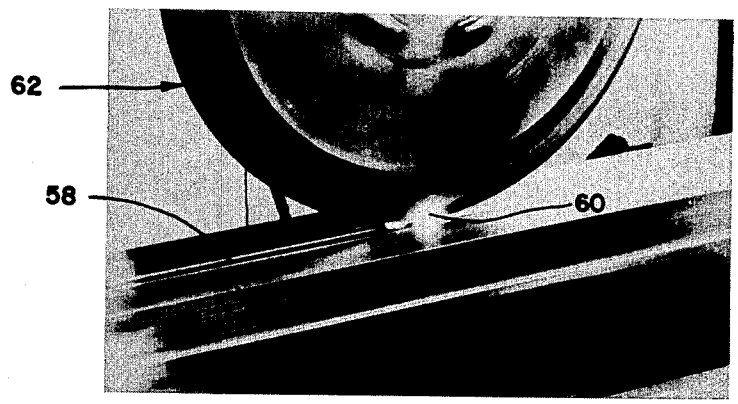
Figure 13:
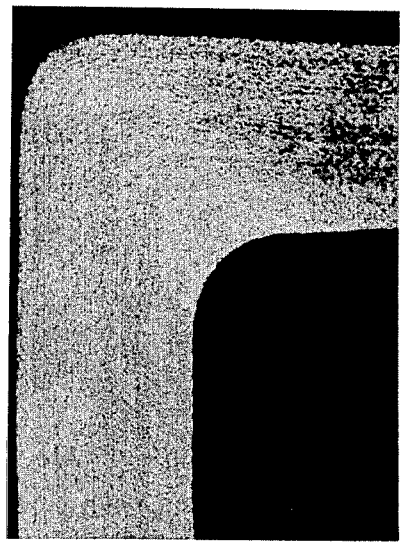
Figure 8:
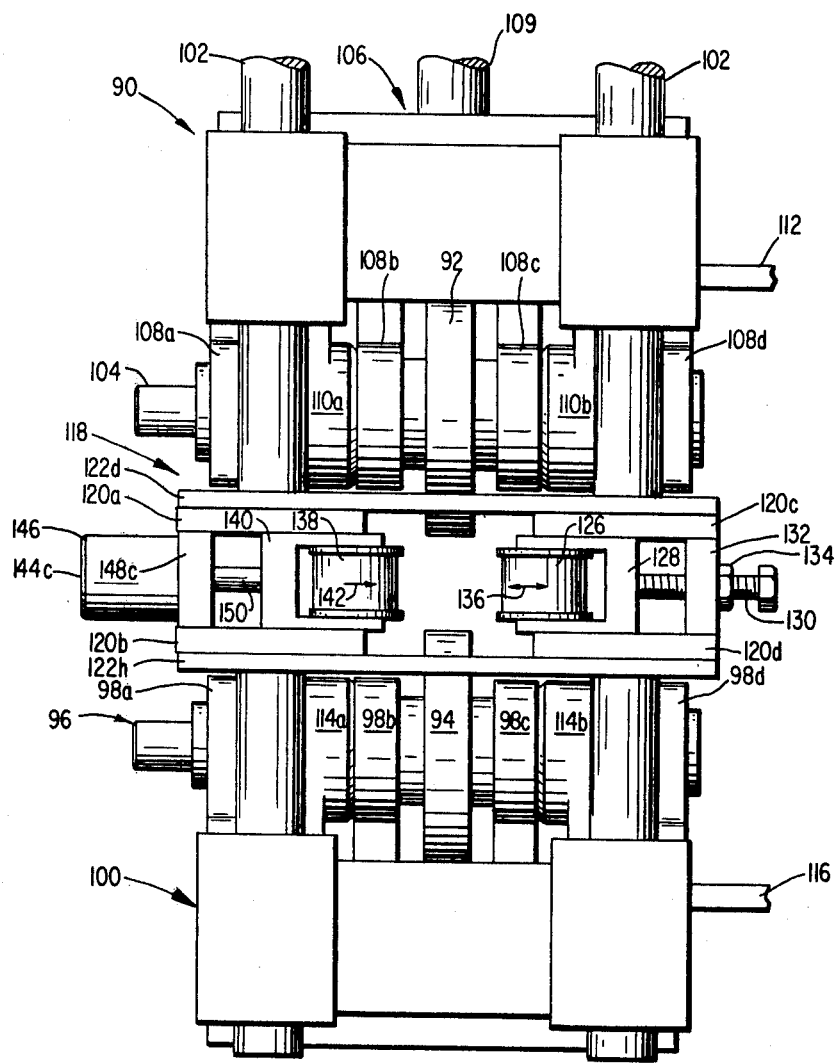
Figure 9:
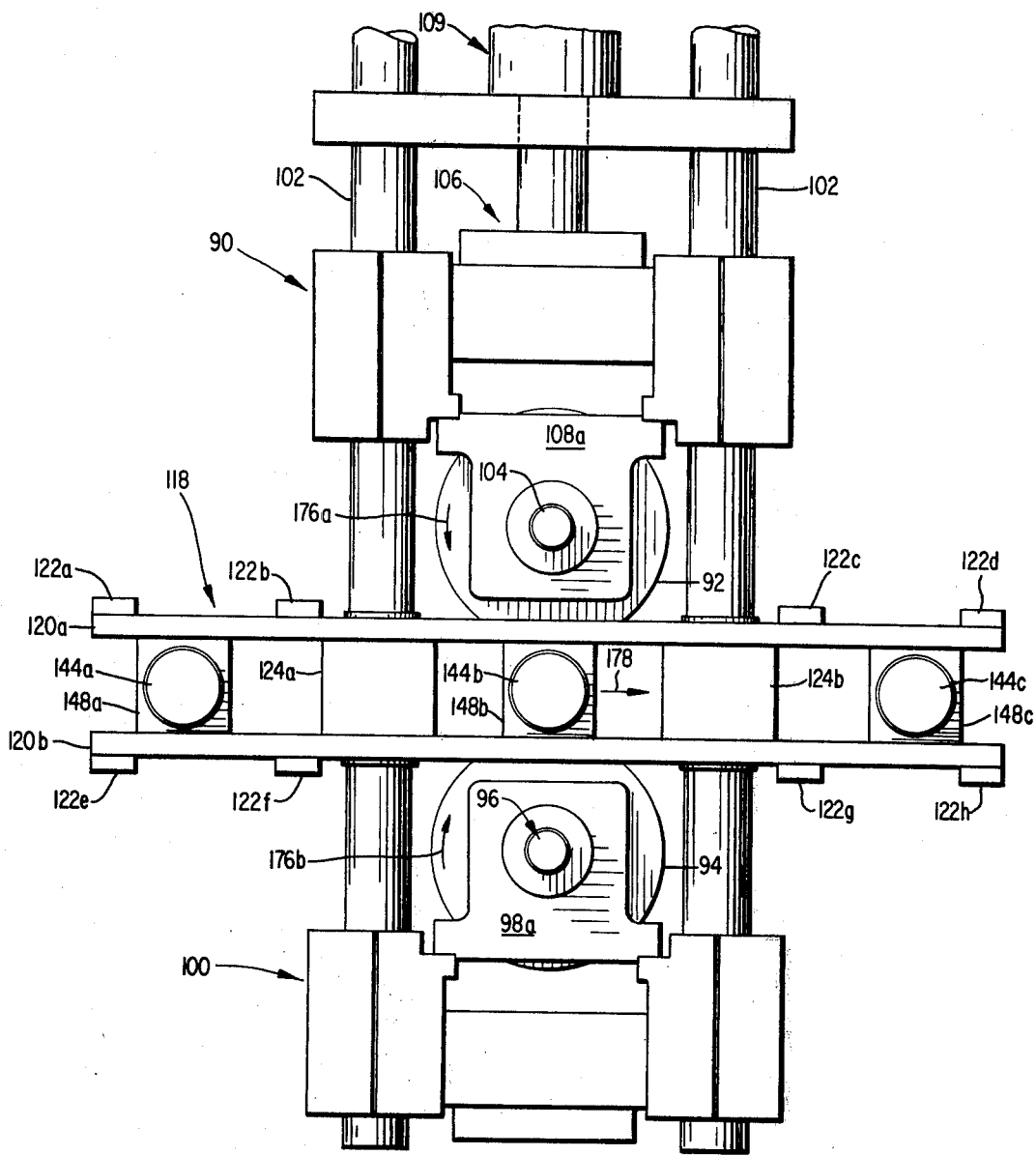
Figure 10:
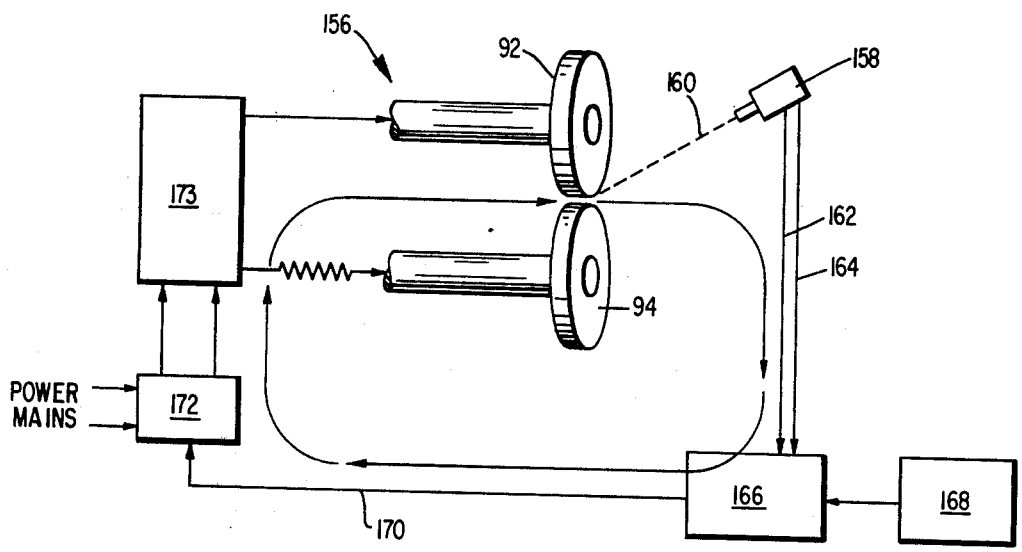
Figure 11:
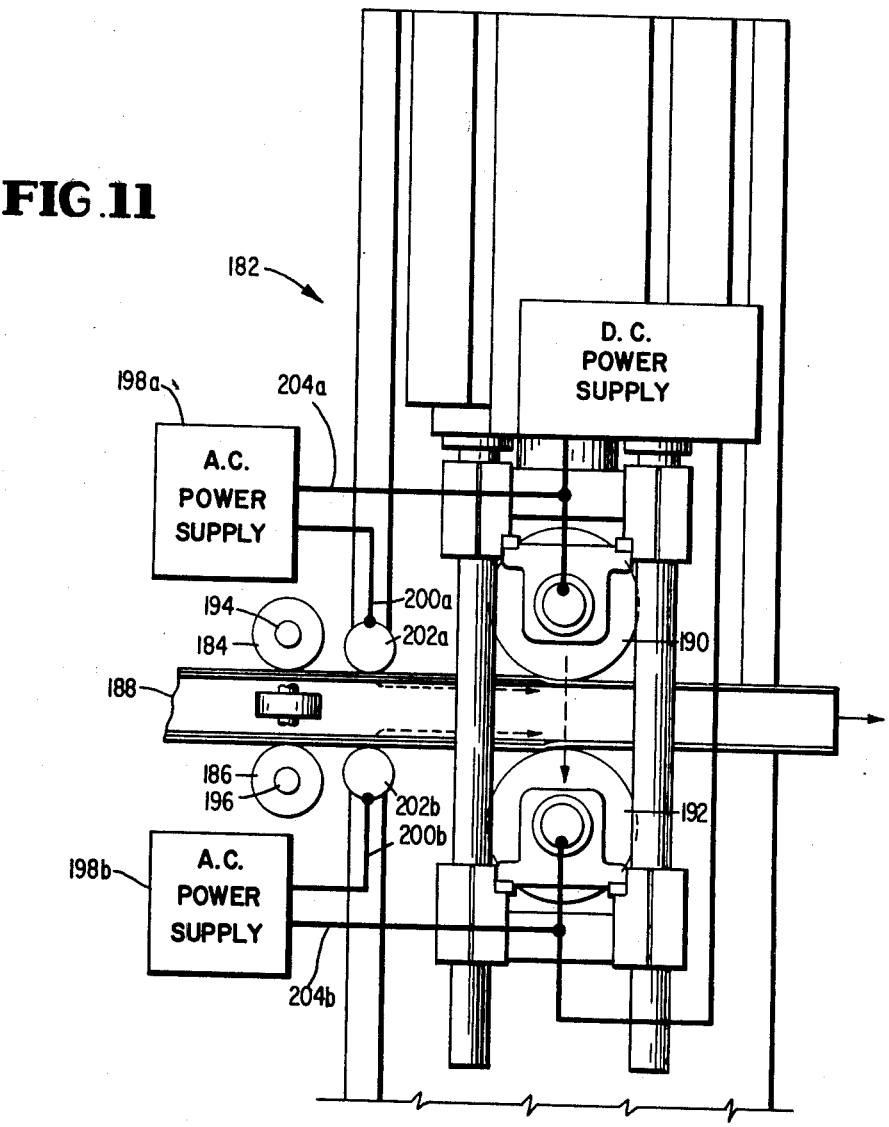
Figure 12:
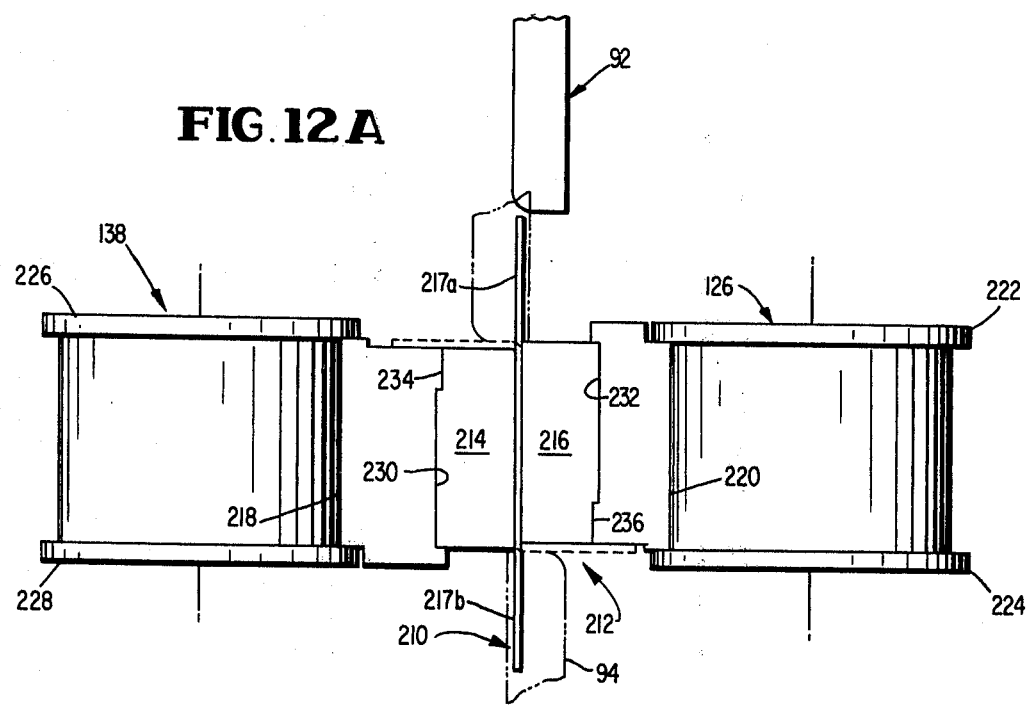
Figure 12:
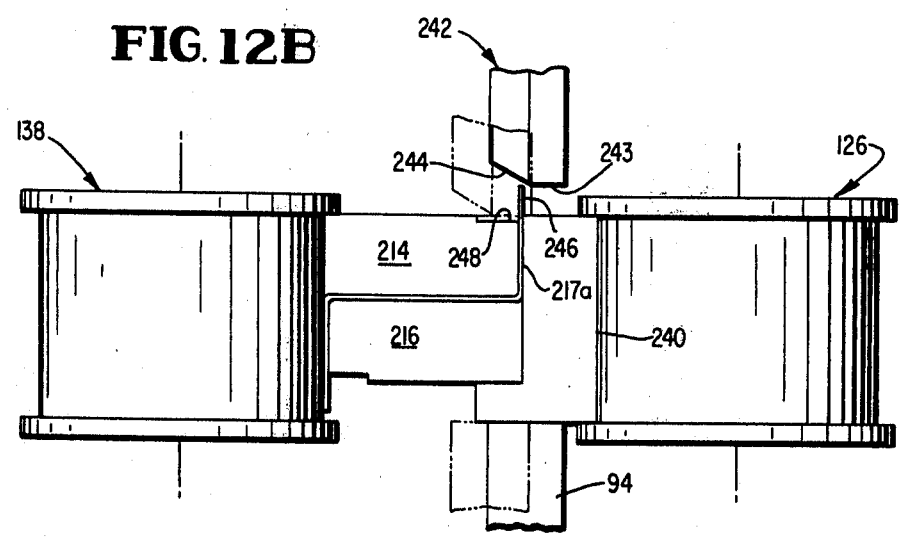
Figure 15:
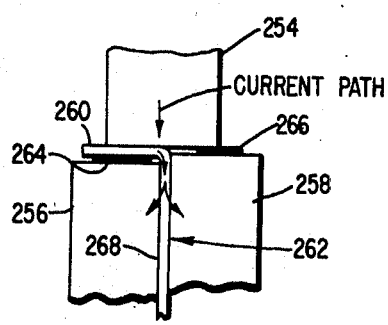
Figure 18:
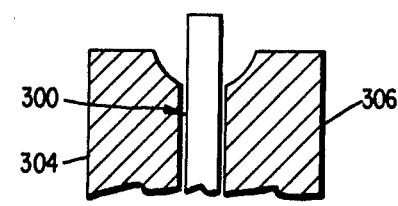
Figure 19:
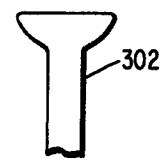
Figure 14:
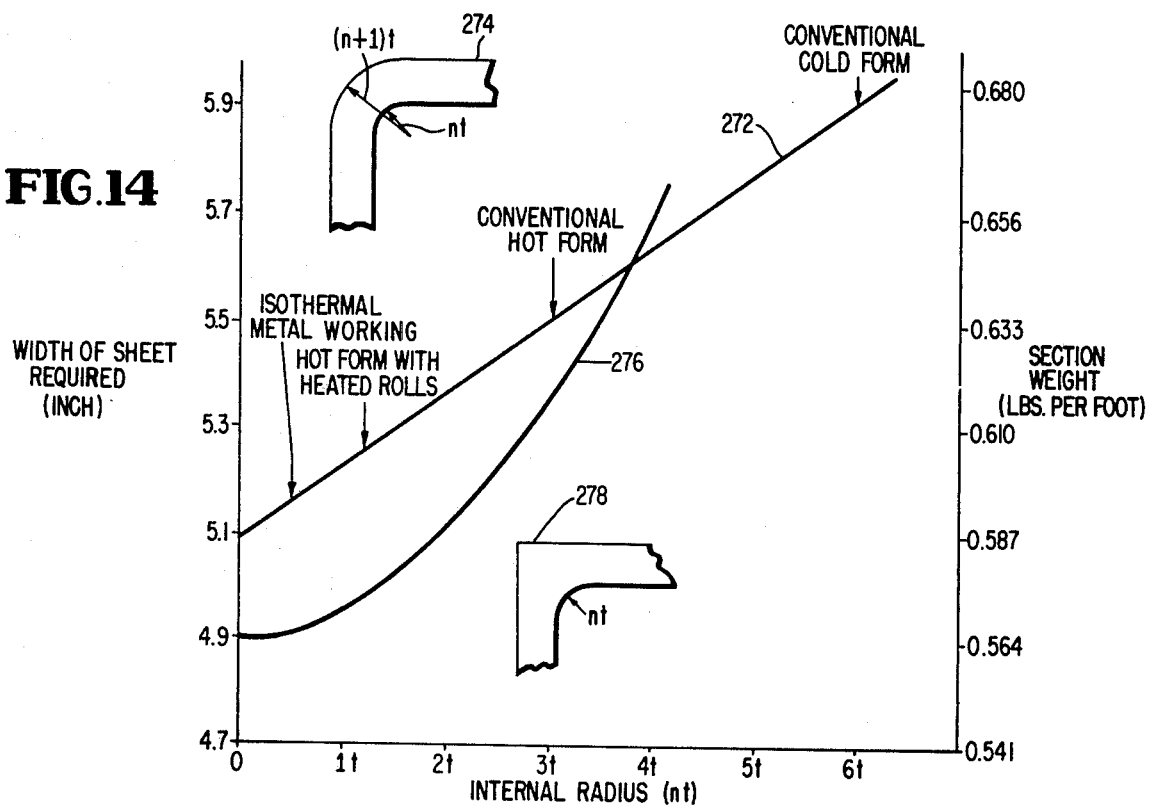
Figure 16:
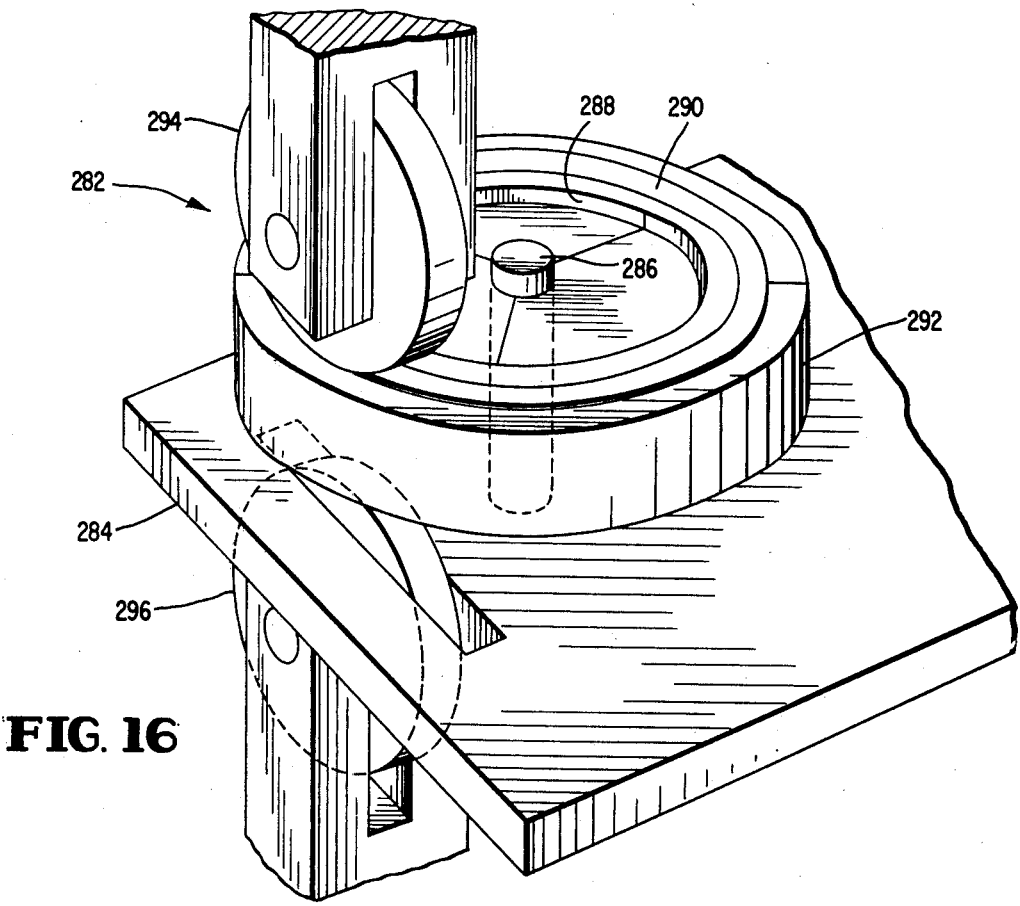
Figure 17:
Figure 29:
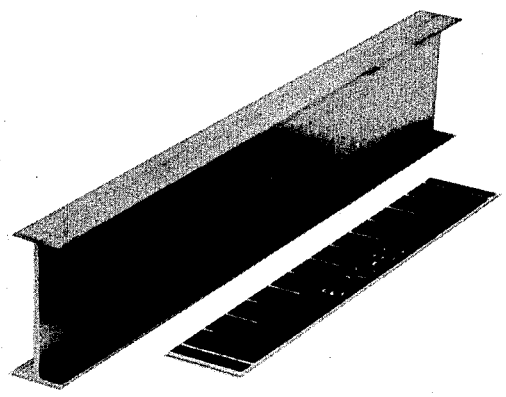
Figure 20:
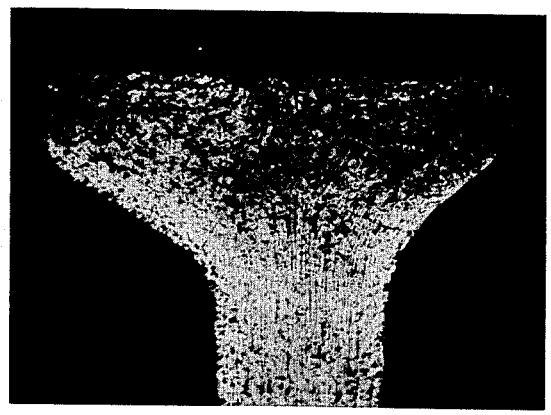
Figure 22:
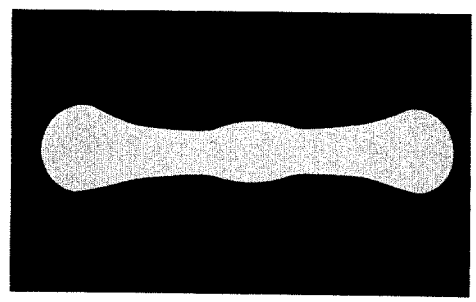
Figure 21A:
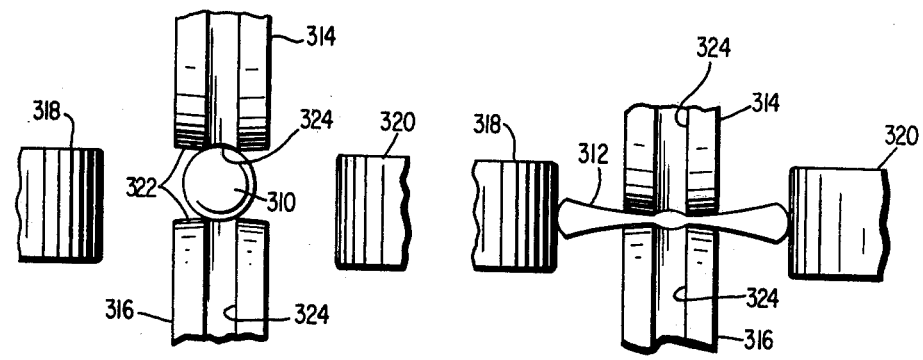
Figure 21B:
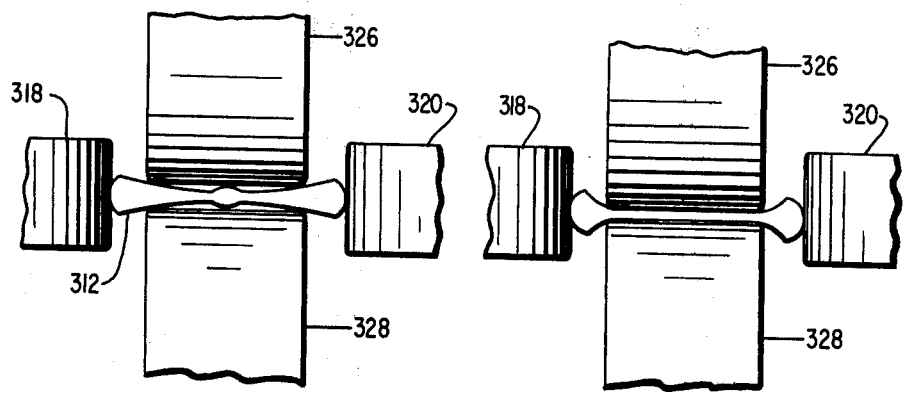
Figure 21C:
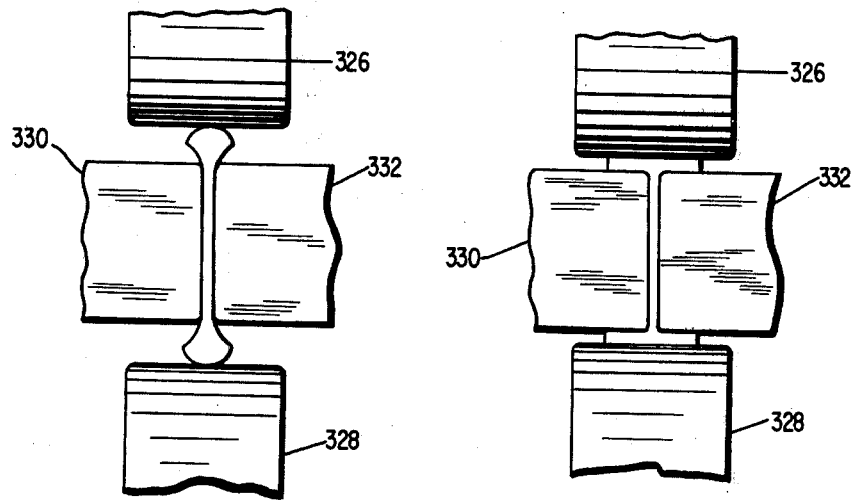
Figure 23:
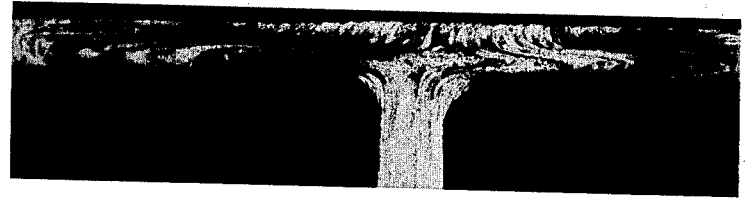
Figure 27:
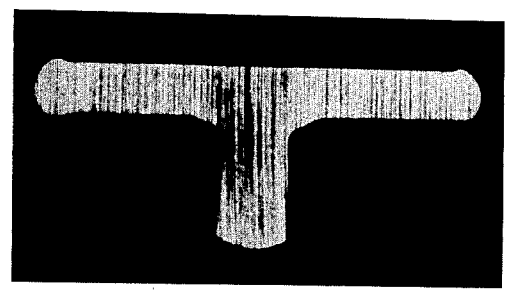
Figure 24A:
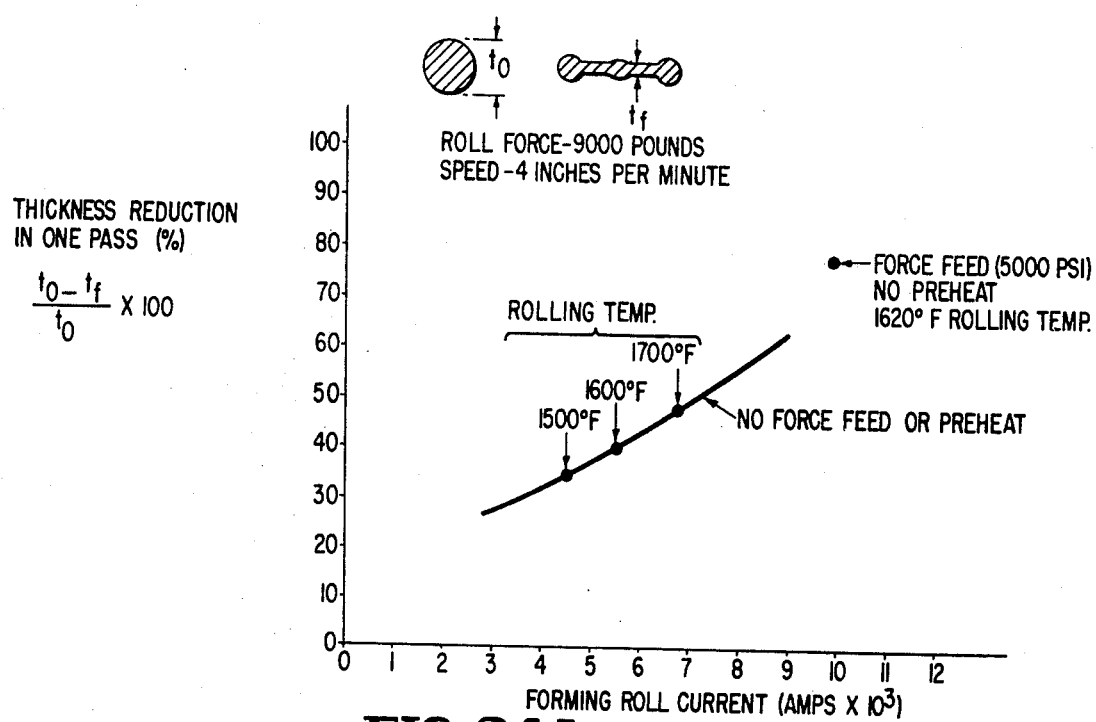
Figure 24B:
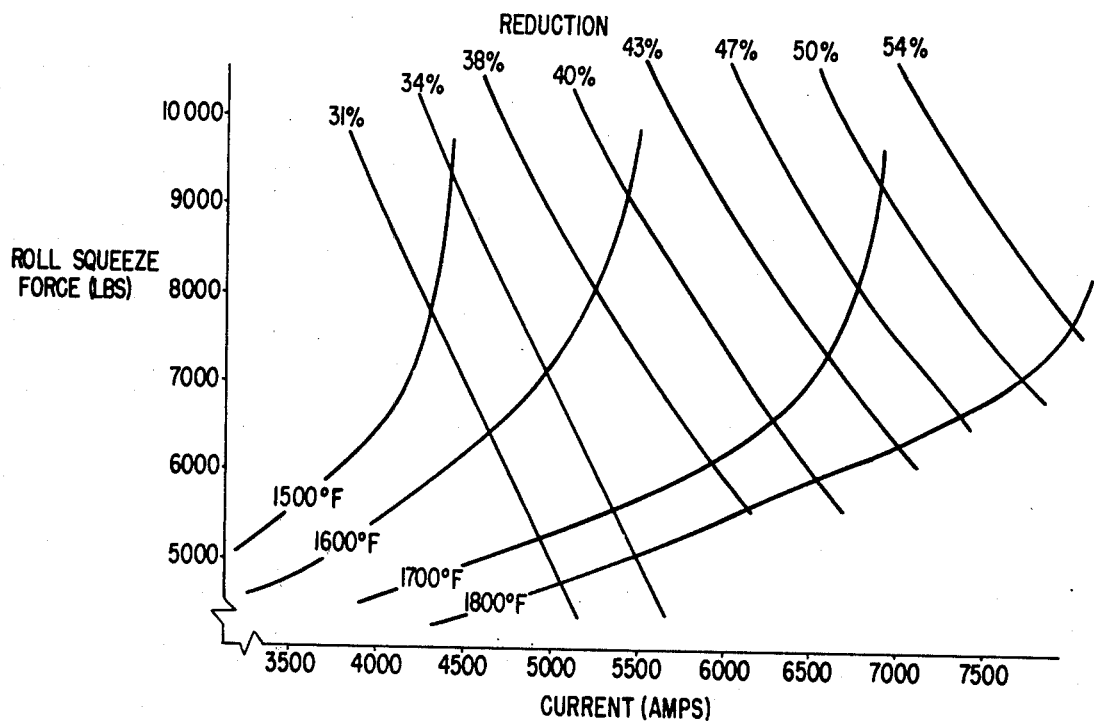
Figure 32A:
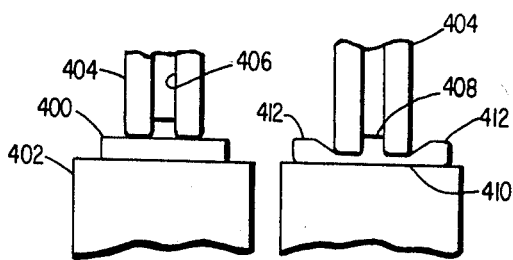
Figure 32B:
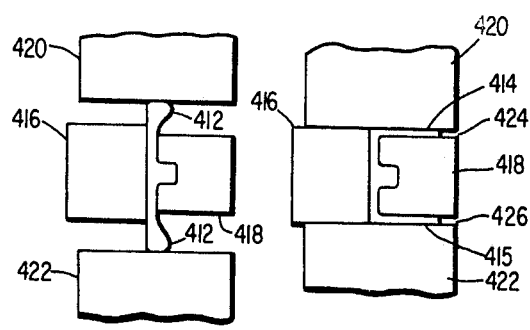
Figure 33:
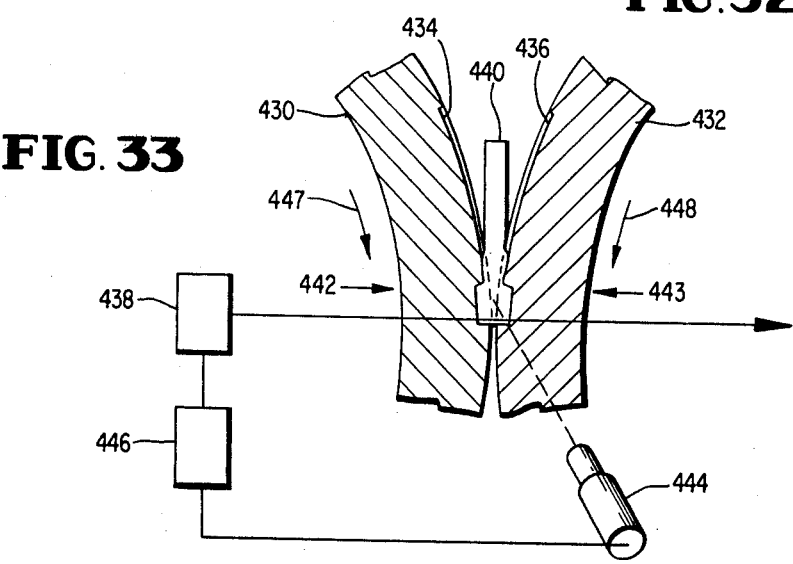
Figure 34:
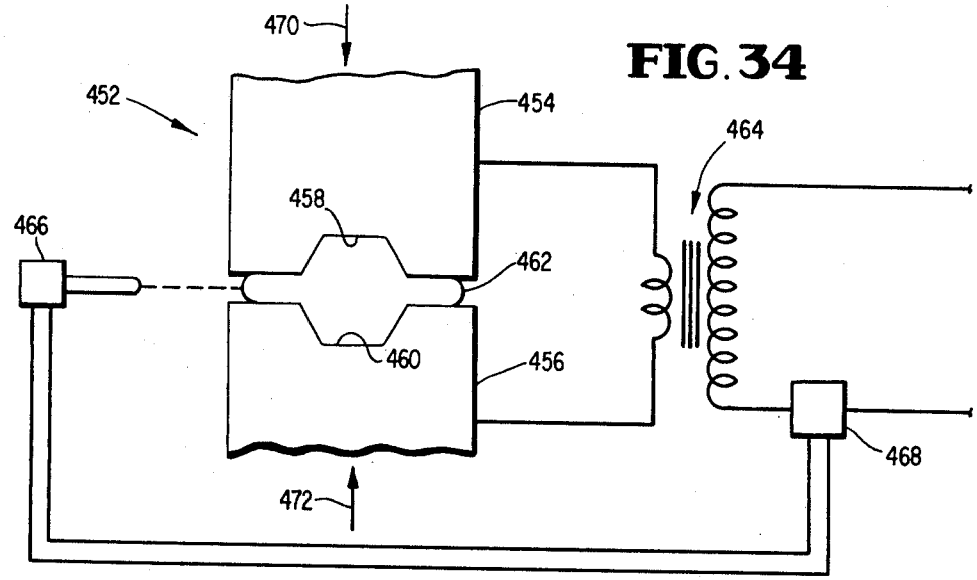
Figure 36:
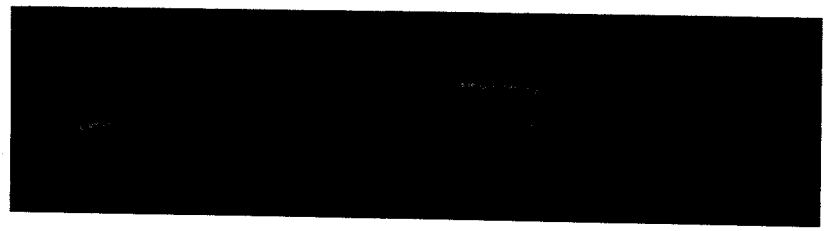
Figure 37:
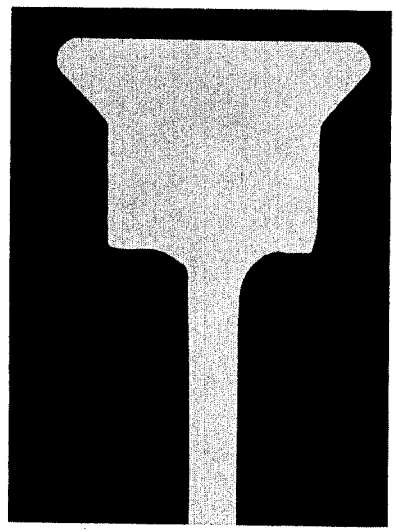

FIG. 3 compares graphically, the relative merits of the present invention and "prior art" metal forming processes as far as their capability for producing thin sections is concerned;

FIG. 4 compares the per pass workpiece reduction capabilities of our process and conventional-hot rolling;

FIG. 5 is a photograph showing the temperature conditions in the forming tool and in the workpiece during forming in accord with the present invention;

FIG. 6 compares, graphically, the forming tool force required to effect a specified percentage of reduction in workpiece thickness when forming a titanium alloy in accord with the principles of the present invention and when forming the same alloy by hot rolling with rolls at both room and elevated temperatures;

FIG. 7 shows, graphically, the relative high temperature strengths of several difficult-to-work metals and an exemplary forming tool material which can be employed to carry out the process of the present invention;

FIG. 8 is a front view of metal forming apparatus constructed in accord with and embodying the principles of the present invention;

FIG. 9 is a side view of the apparatus of FIG. 8;

FIG. 10 is a schematic illustration of one form of control system which can be employed to control process conditions in apparatus of the character illustrated in FIGS. 8 and 9;

FIG. 11 is a side view of a second form of metal forming equipment constructed in accord with and embodying the principles of the present invention;

FIGS. 12A and 12B show in pictorial form the tooling and steps involved in forming a Z-sectioned stringer from sheet material in accord with the principles of the present invention;

FIG. 13 is a photomicrograph of a square bend as would be found in a stringer made by the process depicted in FIGS. 12A and 12B;

FIG. 14 depicts, graphically, the reductions in component size and weight which may be realized by forming Z-section components from sheet materials in accord with the principles of the present invention rather than by other sheet metal forming techniques;

FIG. 15 depicts an alternate method for forming components from sheet metal in accord with the principles of the present invention;

FIG. 16 shows, pictorially, apparatus for forming flanges on a sheet metal cylinder in accord with the principles of the present invention;

FIG. 17 is a photograph of a cylinder formed in accord with the principles of the present invention and in apparatus of the character shown schematically in FIG. 16;

FIG. 18 is a sheet or platelike metallic member which is to be formed to a specified external configuration by upsetting one edge thereof in accord with the principles of the present invention and linear tooling provided to confine the metal as the member is formed;

FIG. 19 is an end view of the member after forming;

FIG. 20 is a photomicrograph of a member formed as depicted in FIG. 18;

FIGS. 21A-21C show, pictorially, the apparatus and tooling employed and the steps involved in forming round barstock into an I-beam in accord with the principles of the present invention;

FIG. 22 is a photomicrograph of a section through the workpiece as it exists after the first step in converting the barstock to the I-beam;

FIG. 23 is a photomicrograph through a section of a component formed to its final configuration essentially as shown in FIG. 21C;

FIG. 24A shows, graphically, the effect of force feeding the workpiece past the forming tool;

FIG. 24B shows, graphically, the effect of squeeze force on workpiece temperature and the trade-offs between squeeze force and current that can be made to get a target percentage of deformation;

FIG. 25 shows, pictorially, a three roll set-up for spreading a thickened edge of a sheet or platelike workpiece of indefinite length into a flange without using linear tooling;

FIGS. 26A-C show, pictorially, the forming tool and linear tooling employed and the steps involved in converting round barstock into a T-section by forward extrusion and spreading of the barstock in accord with the principles of the present invention;

FIG. 27 is a photomicrograph of a section through a T-section formed from barstock in accord with the principles of the present invention;

FIG. 28 shows, pictorially, the tooling employed and phenomena involved in forming a flange by upsetting and spreading the workpiece metal in accord with the principles of the present invention;

FIG. 29 is a photograph of an I-beam having flanges formed by upsetting the edges of a sheet and then spreading the upset edges in the manner shown pictorially in FIG. 28;

FIG. 30 depicts, pictorially, a forming tool and linear tooling for converting round barstock into a Y-sectioned member;

FIG. 31 shows the steps involved in converting the barstock into the Y-sectioned member and in then reducing the leg thickness in the Y-sectioned component;

FIGS. 32A and 32B show the apparatus employed and steps involved in converting a platelike workpiece into an E-sectioned member by backward extrusion in accord with the principles of the present invention;

FIG. 33 is a diagrammatic illustration of apparatus for roll forging a metallic workpiece into a component of selected configuration in accord with the principles of the present invention;

FIG. 34 is a similar view of apparatus for anvil forging metallic workpieces in accord with the principles of the present invention;

FIG. 35 shows the steps involved in forming a turbine compressor blade with apparatus of the character shown in FIGS. 33 and 34;

FIG. 36 is a photomicrograph of an airfoil section formed in apparatus of the character shown in FIG. 33;

FIG. 37 is a photomicrograph of a blade root formed in accord with the principles of the present invention in apparatus of the character shown in FIG. 34;

FIG. 38 shows, diagrammatically, apparatus for forming indefinite as opposed to discrete lengths of material to a selected configuration in accord with the principles of the present invention; in this case the apparatus is set up to convert round barstock to a Y-sectioned member; and FIGS. 39A and 39B show, pictorially, the first and second stands of multi-stage equipment for effecting the continuous conversion of round barstock into an I-beam in accord with the principles of the present invention.

Figure 1:
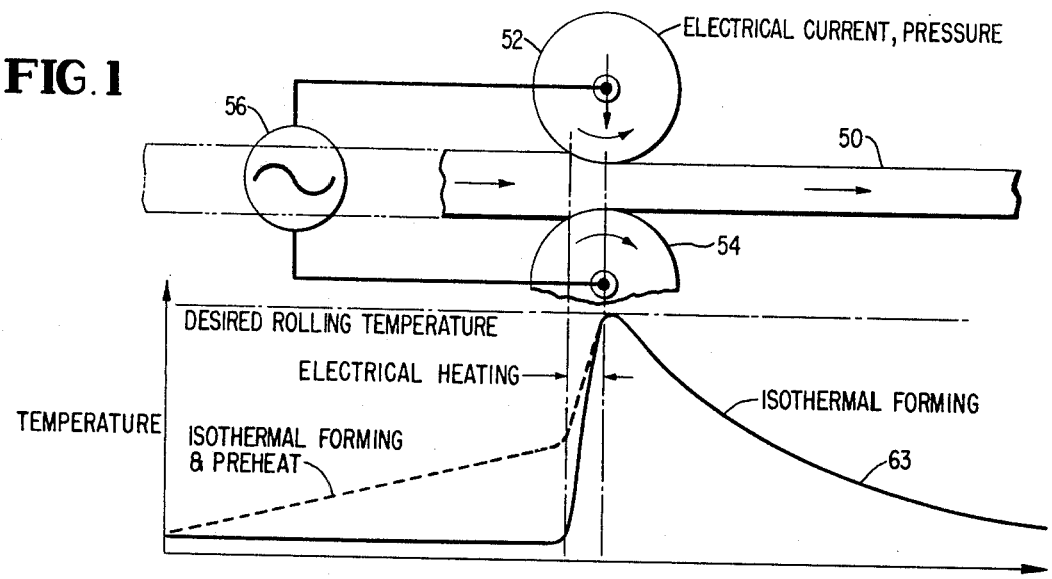
FIG. 1 is a diagrammatic illustration of a metallic workpiece being shaped or formed in accord with the principles of the present invention; the figure also shows the temperature distribution in the workpiece before, during, and after the forming step as well as the effect on the temperature distribution produced by preheating the workpiece prior to forming it.

Referring now to FIG. 1 of the drawing, the novel metal forming process disclosed herein and described briefly above involves the application of localized heat and pressure to the workpiece 50 to be formed. The pressure is applied by a forming tool which is a rotatable roll 52 in the embodiment of the invention shown in FIG. 1. Forming roll 52 is biased toward a second, rotatable forming roll 54 with controlled force to exert pressure of a selected magnitude on the workpiece (the pressure exerted on the workpiece by a forming tool is referred to herein as the "squeeze force"). In this embodiment of the invention, roll 54 may serve as a workpiece support in certain applications of the invention.

As it passes forming rolls 52 and 54, workpiece 50 is heated sufficiently high to make it plastic, the force exerted on the workpiece and the heat supplied to it being correlated to keep the workpiece below its solidus temperature.

The heating is accomplished by connecting the two forming rolls 52 and 54 to opposite sides of an electrical power source 56, the two forming rolls thus serving as electrodes. The circuit between the two forming rolls is completed through the workpiece.

One of the important criteria of the invention is that the forming tool or tools be fabricated of a refractory metal. Molybdenum is satisfactory as are its alloys such as TZM and TZC. Tungsten, tantalum, and columbium and their alloys and other refractory metals and refractory alloys may also be employed with the choice being dictated by the requirements of a particular application, the costs of manufacturing the forming tool from different candidate materials, the service life of particular materials etc.

The use of a refractory metal forming electrode and the particular method of heating the workpiece described above are important in our process. They permit the workpiece to be heated to temperatures sufficiently high that even the most difficult-to-work metals become plastic and can be readily formed because the refractory forming tools retain a high proportion of their strength at elevated temperatures.

Workpiece temperatures of 2500° F. are readily reachable in our process; and even higher forming temperatures can be employed, if desired. Molybdenum alloy forming tools are capable of being used at temperatures as high as 2500° F.; and tools of tungsten and its alloys, for example, can be used at still higher temperatures.

The temperature relationship between the workpiece and forming tool is shown dramatically in FIG. 5 in which both a localized portion of a workpiece 58 being formed and a peripheral portion 60 of the forming roll 62 are incandescent. Typically, this "hot spot" 60 will be on the order of one inch long and one-half inch deep.

This essentially isothermal relationship between the workpiece and the forming tool means that the forming tool can be heated to and kept at a temperature approaching that of the workpiece so that there is no appreciable flow of heat from the workpiece into the forming tool.

Also important in our process and shown in FIG. 5 is that only a small, localized zone of the workpiece is at an elevated temperature as opposed to the conventional preheat/hot forming process in which the entire workpiece is heated to the forming temperature at which it should remain until the forming step is completed.

FIG. 5 additionally shows that the small incandescent portion of the forming tool is backed by a large mass of metal at much lower temperatures. This contributes to the strength of the tool during the forming process and, also, to the maintenance of a near isothermal relationship between the forming tool and workpiece.

Not only do the forming tool materials employed in the present invention have high strength at elevated temperatures, but the strength differentials between these materials and hard metals and alloys such as titanium alloys and superalloys increase at higher temperatures. This is shown graphically in FIG. 7 in which temperature versus hardness is plotted for the refractory forming tool alloy TZM and for the exemplary workpiece metals titanium, Ti-6 Al-4V, Hastelloy X, and superalloy Inconel 718. At temperatures at which these and other hard-to-work metals flow easily, refractory metal forming tools are still strong and rigid.

As discussed above, one of the important features of our novel process is that the workpiece is at an elevated temperature only for the short period of time that forming is actually taking place and for a short period of time thereafter, the total time being measured in seconds. This unique time/temperature relationship is shown graphically by curve 63 in FIG. 1.

The workpiece 50 remains close to ambient temperature until contacted by the forming rolls 52 and 54. Thereafter, the temperature increases rapidly, reaching the maximum forming temperature at the point of maximum deformation of the workpiece by the forming tool. Thereafter, the temperature of the formed workpiece rapidly decreases to ambient temperature as it moves beyond the forming tool.

Figure 2:
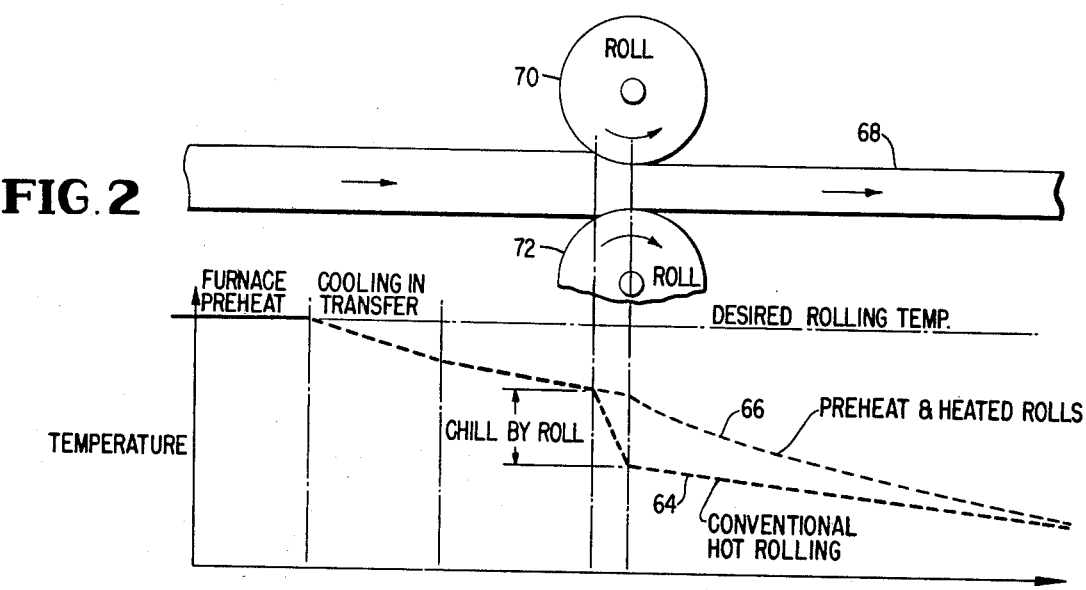
FIG. 2 is a view similar to FIG. 1 showing the temperature distribution in workpieces formed by conventional hot rolling and by hot rolling with heated rolls.

The differences between the forming process disclosed herein and conventional hot-forming techniques, both with room temperature and heated tools, are readily apparent from a comparison of curve 63 in FIG. 1 with curves 64 and 66 in FIG. 2. In both of the conventional processes, the workpiece 68 is first preheated to the forming temperature and then transferred to the forming rolls 70 and 72. The workpiece is then formed and allowed to cool. As shown in FIG. 2, this approach in both cases results in the workpiece being at an elevated temperature for a relatively long period of time.

The disadvantage of long periods at elevated temperatures have been discussed above. This characteristic of heretofore available hot rolling processes makes it impractical to form hard metals and alloys in the manner shown in FIG. 2, even if the forming tools are heated.

Furthermore, small workpieces cool to a considerable extent in the transfer from the preheating furnace to the forming station. The heat lost in transfer alone would result in an alloy such as Rene' 95 becoming too hard to be formed by rolls 70 and 72 even if they were heated. Actual experience has shown that Rene' 95 workpieces with cross-sectional diameters below one inch could not be reduced by conventional hot working, even when the workpieces were clad in steel.

In the conventional process as practiced with unheated rolls, the workpiece is also chilled by the rolls themselves as shown in FIG. 2 so that, at the point of maximum deformation, the workpiece temperature may be several hundred degrees below the desired rolling temperature rather than at this temperature as in our process. The conventional process is as a consequence entirely unsuitable for forming hard-to-work metals.

The problem of chilling is particularly acute when a thin section is being formed because the "chill" may extend completely through the section, making it entirely unformable even if it is of a metal which can be formed by conventional processes in thicker sections.

That the conventional processes become limiting in forming thin sections is shown graphically in FIG. 3.

Curve 73 shows, for example, that the titanium alloy Ti-6Al-4V cannot be thinned to less than 0.10 inch by conventional hot rolling because of the surface cracking which occurs due to chilling of the workpiece. As shown by curve 74, an improvement is obtained by heating the forming tools. However, even then, the minimum thickness which can be reached is 0.05 inch because of the surface contamination introduced into the workpiece in the preheat step.

In contrast, and as indicated by curve 75 in FIG. 3, we have reduced the thickness of Ti-6Al-4V to less than 0.005 inch by our novel process. This is an improvement of an order of magnitude over the conventional process and is of obvious importance in forming components such as the turbine compressor blade shown in FIG. 35, for example, which has an airfoil section tapering to very thin leading and trailing edges.

As discussed previously, our process is unique in the massive per pass deformation of the workpiece that we achieve. This is important for the obvious economic reason that increased reduction per pass through the forming tools reduces the number of passes required and also because of the refinement of grain structure and other beneficial changes in the microstructure of the workpiece which can be obtained by a high percentage of reduction or deformation.

The changes in the microstructure of the workpiece which can be achieved by forming it in accord with the principles of the present invention are important because they result in improved tensile properties as well as much higher shear strength, fracture toughness, and endurance limit.

Typically, at least a 50 percent reduction will be obtained in a forming operation in accord with the principles of the present invention; and the amount of deformation may approach 100 percent as in the formation of the airfoil section shown in FIG. 36, for example.

The differences between our novel process and conventional hot forming from the viewpoint of the amount of workpiece deformation obtained are apparent from FIG. 4. A metal which taxes the capability of the conventional process to the maximum such as Ti-6Al-4V can easily be reduced in thickness by 86 percent in one pass as shown by curve 76 in FIG. 4. On the other hand, a maximum of 20 percent reduction per pass is typically all that could be obtained by the conventional process.

Accordingly, to reduce an 0.50 inch thick workpiece to a thickness of 0.07 inch as shown in FIG. 4 by the conventional process would typically require nine passes (see curve 78) as opposed to the single pass that suffices when our process is employed. The relatively low percentage of deformation per pass has only limited beneficial effects on the workpiece microstructure. The repeated heating of the workpiece coupled with the low percentage of deformation may lead to grain growth and weakening of the material, for example.

Another advantage of our process, discussed above, is that the force required to form the workpiece is relatively low and less affected by the amount of reduction per pass than is the case in the heretofore available processes.

As shown by curve 80 in FIG. 6, conventional forming processes require forces which can equal or exceed the forming tool strength for even modest reductions in workpiece thickness because the requisite roll force increases rapidly with increases in the amount of reduction which is being attempted. The relatively massive amounts of deformation required for improving the workpiece microstructure by reducing grain size, for example, cannot be reached at all.

While the ratio of force to reduction can be reduced by heating the forming tool as in the Fischer process, for example, this ratio is still many times larger than it is in the present invention. Furthermore, while heated rolls do in theory permit greater per pass reductions in the workpiece, experience has shown that this is limited by restrictions on the workpiece temperature set by scaling and contamination and by limitations on the forming tool temperature set by the decrease in the strength of the forming tool.

Extrapolating curves 82 and 84 of FIG. 6 will show that roll forces in excess of 70,000 pounds per inch of workpiece width are required to reduce Ti-6Al-4V by 50 percent by the Fischer process whereas this force can be reduced to considerably below 10,000 pounds per inch of width to produce the same percentage of reduction if the alloy is formed in accord with the principles of the present invention.

Another problem in rolling thin sections with conventional rolls is that "roll flattening" limits the amount of reduction which can be obtained. This problem becomes even more acute when the rolls are heated as in the Fischer process. In contrast, the localized "hot spot" on the forming tool in our process causes a "thermal bulge" which offsets any flattening and permits even foil gages to be rolled as discussed above.

Roll flattening is also minimized in our process because the yield strength and elastic modulus of the refractory metal forming tools remain high even at temperatures in the range of 2000°–2200° F. and higher.

The various parameters involved in forming metal by our novel process will vary from application-to-application. To illustrate the values which these parameters may assume, however, we have employed currents of 3,500–20,600 amperes at voltages ranging up to 15 volts, forming forces of 8,500–33,500 pounds for rotatable forming tools between one and two inches wide, compressive feed forces ranging up to 12,500 pounds, front tensions ranging up to 5,800 pounds, and forming speeds of 2–20 inches per minute.

Decreasing the forming speed typically results in increased flow of the workpiece metal, reducing the number of passes required to form the component. From an economic point-of-view, lower speeds may in some applications therefore be preferable. Lower speeds may in some instances also result in components of superior quality because of the lower strain rate and increased metal flow.

A lubricant will typically be employed to eliminate sticking between the workpiece, forming tool, and guide rolls or linear tooling. The lubricant will also typically promote the desired lateral flow of the workpiece metal and minimize unwanted elongation of the workpiece.

One suitable lubricant is flake graphite. Other lubricants can be used instead although conventional hot die, rolling mill, and other lubricants are not satisfactory because, in our process, it is essential that the lubricant not alter the path of or otherwise interfere with the electrical current flow.

Also, the lubricant must be free of a tendency to stick to the forming tool or to deteriorate the workpiece, easily removable from the workpiece, economical and easy to apply by non-skilled personnel, and otherwise generally satisfactory for shop use.

Another lubricant which has the characteristics necessary for our process is finely divided tungsten powder (ca. 1 micron particle size is satisfactory) dispersed in a plastic binder.

This type of lubricant is particularly useful in forming steels and iron and cobalt or nickel based superalloys because graphite has the potential for causing such materials to melt.

Flake silver is also a good lubricant for thos applications where graphite cannot be used.

As indicated above, an inert atmosphere is not necessarily required in our novel process to protect the workpiece against deterioration because of the short periods for which the workpiece metal is at an elevated temperature. It may, however, be beneficial to purge the area in which the forming takes place with an inert gas such as argon to prevent loss of the lubricant by oxidative deterioration.

Referring again to the drawing, FIGS. 8 and 9 show, diagrammatically, one form of apparatus 90 in which metallic workpieces may be formed into components of selected configuration in accord with the principles of the present invention. In apparatus 90, the forming is accomplished by effecting movement of the workpiece between and relative to upper and lower forming tools 92 and 94. The forming tools also serve as electrodes between which electrical current can flow through the workpiece. As discussed above, the forming tools are fabricated from a refractory metal so that they will retain their strength at the temperatures necessary to form hard metals.

The lower forming tool 94 is mounted on a lower drive shaft 96 supported in bearings (not shown) disposed in four bearing housings 98a–d. The bearing housings are, in turn, supported from a lower head 100 clamped to four vertically extending structural columns 102 (only two of which are shown in FIGS. 8 and 9).

The upper forming tool 92 is similarly mounted on an upper drive shaft 104 rotatably supported from an upper head 106 by bearings (not shown) disposed in bearing housings 108a-d. The upper head 106 is slidably mounted for movement in a vetical direction on structural columns 102.

In the forming operation, a force of predetermined magnitude is exerted on the workpiece being formed by biasing upper head 106 and, therefore, the upper forming tool toward the lower forming tool 94. The force is exerted by a hydraulic ram 109 which, in the illustrated machine, has a nominal 25,000 pound capacity.

The upper forming tool/electrode 92 is connected to one side of an electrical power source through rotary current collectors 110a and 110b and a bus bar 112. The lower forming tool/electrode 94 is connected to the opposite side of the power source through current collectors 114a and 114b and bar 116. The circuit is completed through the workpiece as discussed above.

The dimensions of the rotatable electrodes will of course depend upon the configuration and dimension of the workpiece and the configuration into which it is to be formed as well as the physical capabilities of the other machine components. In the machine shown in FIGS. 8 and 9, the electrode/forming tools are 2 inches wide and 12 inches in diameter. They are fabricated from TZM molybdenum alloy.

The workpiece to be formed and associated tooling (if employed) are guided between the upper and lower electrodes 92 and 94 by a workpiece guidance system 118. This system consists of upper and lower longitudinal rails 120a-d connected into an integral structure by tie bars 122a-h and four sleeve bushings (only two of which, 124a and 124b, are shown). The workpiece guidance system is supported for vertical sliding movement on the structural columns 102 of the machine, the latter extending through the bushings of the guidance system.

Rotatably mounted between the upper and lower longitudinal rails 120c and 120d of the workpiece guidance system in longitudinally spaced relationship is a set of rear clamp rolls 126 (only one of which is shown). In the illustrated machine, three rear clamp rolls are employed.

Each of the three clamp rolls 126 is supported for rotary movement about a vertical axis in a support 128. The supports are slidably mounted between upper and lower rails 120c and 120d of the guidance system so that they can be moved toward and away from forming tools 92 and 94 to accommodate different workpieces and tooling.

Adjustment of each rear clamp roll is effected by a threaded member 130 fixed to the associated clamp roll support. The threaded member protrudes through a stiffener block 132 between rails 120c and 120d and is threaded through an internally threaded member 134 fixed to the outer side of the stiffener block. By rotating the adjusting member 130, it can be caused to move longitudinally in member 134, displacing the associated slide and rear clamp roll toward and away from forming tools 92 and 94 as shown by the double-headed arrow 136 in FIG. 8 to align the rear clamp rolls relative to each other and the forming tools.

Cooperating with the rear clamp rolls just described to guide the workpiece through machine 90 are three front clamp rolls 138 (only one of which is shown) each located opposite one of the rear clamp rolls. The front clamp rolls are supported for rotation about vertical axes from supports 140 slidably disposed between guidance system upper and lower front rails 120a and 120b.

In operation, hydraulic rams 144a-c bias the front clamp rolls toward the rear clamp rolls as shown by arrow 142 in FIG. 8 to confine the tooling and workpiece to a rectilinear path through the forming rolls. The barrel 146 of each ram is fixed to an associated support and stiffener block 148a-c mounted between upper and lower front rails 120a and 120b of the workpiece guidance system. The actuator 150 of the ram extends through the the block 148 and has its free end fixed to the associated clamp roll support 140.

As in the case of the parameters discussed above, the clamping forces to be exerted by hydraulic rams 144a-c will be dictated by the requirements of the particular application of the invention. In general, however, we have found that clamping forces equal to the force exerted by the upper forming tool 92 on the workpiece will be sufficient to guide the workpiece through the machine and to keep the tooling members between which the workpiece may be confined from spreading.

The workpiece guidance system is clamped to the vertical structural columns 102 of machine 90 to position the lower forming roll 94 at the appropriate level in those applications of the invention involving forming only by the upper forming roll. The lower forming roll acts as a support for the workpieces and any associated tooling.

In those operations involving forming by both forming rolls such as the simultaneous spreading of upper and lower I-beam flanges, the guidance system will be left to float in a vertical direction. Preferably, the system will be counterbalanced so that it will move freely in the latter mode of operation.

A further, and most important, aspect of the apparatus employed in carrying out the process disclosed herein is a system for controlling the density of the current flowing from forming tool 92 to forming tool 94 through the workpiece being formed. One control system 156, which can be employed in a machine of the character illustrated in FIGS. 8 and 9, is illustrated in FIG. 10.

The illustrated control system is of the highly preferred feedback type. A detector 158 generates an electrical output signal indicative of the actual forming conditions. A comparison is made between the actual conditions as ascertained by the detector and the established conditions. If there is a deviation, an error signal is generated and employed to adjust the density of the current through the workpiece in the direction necessary to bring the forming conditions to the established level.

In the illustrated system the feedback signal generating detector is a radiation pyrometer sighted on the portion of the workpiece being formed as indicated by line 160. The pyrometer will preferably be one having a small target area such as an Ircon Model 300. Use of a pyrometer of this character avoids the necessity of employing elaborate networks to remove unwanted electrical signal components.

The output signal from the pyrometer is conducted by inputs 162 and 164 to a process controller 166 where the signal is compared with a setpoint reading to identify deviations from the desired forming temperature. One suitable process controller for use with machines of the character shown in FIGS. 8 and 9 is the Research, Inc. "Thermac Model PC 5192." The setpoint is obtained manually or by a programmer 168 which may be, for example, a Research, Inc. "Data-Trak Model 411.01."

The process controller 166 is connected through output 170 to an SCR power controller 172 such as a Loyola LPAC-3-480-207. The power controller regulates the level at which the current flows to the workpiece from a conventional power supply 173. The power supply is connected to an AC power source and to the forming tools 92 and 94 in the manner described above.

The primary function of the control system is to so regulate the density of current flowing through the workpiece as to maintain the workpiece temperature substantially constant or to vary it in a predetermined pattern. Because of the importance of maintaining the temperature precisely at the desired level, the novel, closed loop type of control system just described is preferred.

It is not essential that the detector be a radiation pyrometer. Other detectors or sensing devices which can be employed instead of the latter are illustrated and described in parent application No. 426,564.

Control over the force exerted by the forming rolls is also important in ensuring satisfactory results; and machine 90 will, therefore, preferably be provided with a system for controlling this workpiece forming parameter. This control system has not been shown because the details of the system are not considered essential to an understanding of the present invention or to its practice.

Briefly, however, this system will preferably be of the closed loop, feedback type like the temperature control system. It will typically consist of one or more load cells so located as to respond to the force exerted on the workpiece and feedback circuits from the load cell to an appropriate process controller for hydraulic ram 109.

In some applications of the invention, feeding of the workpiece through the machine will be accomplished by rotating the upper and lower forming rolls in the directions shown by arrows 176a and 176a in FIG. 9 to displace the workpiece in the direction shown by arrow 178.

In other applications, the forming rolls will be left to freewheel; and the workpiece will be pulled through the machine as with a hydraulic ram (not shown) to apply front tension to the workpiece.

In still other applications, compressive feeding of the workpiece will be utilized to produce lateral flow of the workpiece by exerting on the unformed part of the workpiece a force acting in the direction of movement of the workpiece toward the forming rolls. This force feed also eliminates the slippage between the workpiece and the forming rolls which can occur at higher reductions (typically 50 percent or greater) and also in multistand operations to compensate for such elongation of the workpiece as may occur prior to a given forming stage. Because the workpiece is unheated until it reaches the forming roll, very high compressive feed forces can be applied.

In conjunction with the foregoing, force feeding of the workpiece between the forming rolls with the rolls freewheeling can be employed to obtain reductions up to nearly 100 percent. The process at this point becomes similar to extrusion, the rotatable forming rolls resembling extrusion dies with surfaces renewable as the rolls rotate.

And, in still other applications, combinations of the foregoing feed techniques may be employed. For example, compressive feeding will often be used in combination with front tension, the forming rolls typically being left to freewheel in this case. The combination of compressive feeding and front tension promotes lateral spreading of the workpiece metal and minimizes bowing and other departures of the workpiece from straightness in the forming operation.

In those applications requiring driving of the upper and/or lower forming rolls, the mechanism for driving them (not shown) may be of the character described in parent application No. 426,564.

FIG. 11 shows, again diagrammatically, a machine 182 for carrying out our forming processes which differs from the machine 90 described previously in that it is equipped for compressive feeding of the workpiece. In this machine upper and lower feed rolls 184 and 186 feed the workpiece 188 between upper and lower forming rolls 190 and 192.

The feed rolls are mounted on transversely extending drive shafts 194 and 196. The drive shafts can be rotated by any system capable of exerting the requisite force and of driving the rolls at the requisite speed with a high degree of accuracy. Many motor speed controlling systems capable of operating with a high degree of accuracy, such as the SCR type developed by General Electric Company, are available. It is accordingly not deemed necessary to describe or illustrate the motor and its control system herein.

The faces of feed rolls 184 and 186 may be serrated to improve the grip on the workpiece 188. Any indentations, etc. imparted to the workpiece by the serrations will be eliminated in the subsequent forming operation.

The foregoing force feed system is only one example of those which can be employed. Other mechanisms which are suitable for feeding workpieces through metal forming machines are well-known to those in the metalworking field.

As discussed briefly above, moderate preheat can in some cases be employed to advantage in forming metallic workpieces by the process disclosed herein. Provision for preheating the workpiece is also made in the machine shown in FIG. 11. Again, the heating is effected by completing an electrical circuit through the workpiece being formed.

In this case, the current is supplied from A.C. power supplies 198a and 198b through leads 200a and 200b to rotatable electrodes 202a and 202b located ahead of the forming rolls 190 and 192 in machine 182. The power supplies (which will typically be incorporated into a single unit in actual practice) are also connected through leads identified generally by reference characters 204a and 240b to the forming rolls.

Accordingly, one workpiece preheating circuit is completed from power supply 198a through lead 204a, upper forming roll 190, workpiece 188, electrode 202a, and lead 200a back to the power supply. A second preheating circuit is similarly completed through the workpiece from power supply 198b. Again, a feedback control system of the character described above (not shown) can be employed to ensure precise regulation of the temperature to which the workpiece is preheated.

Another advantage of our process suggested by the machine shown in FIG. 11 is that satisfactory results are not dependent upon the nature of the electrical current caused to flow through the workpiece. Alternating current, direct current, or a combination of both may be employed, the latter variation being shown in FIG. 11.

Referring again to the drawing, FIGS. 12A and 12B depict the steps involved and linear tooling employed in one typical method of forming a Z-sectioned member in accord with the principles of the present invention and in apparatus of the character described above. Certain of the machine components have also been included in FIGS. 12A and 12B for the sake of clarity. These components are identified by the same reference characters as in FIGS. 8 and 9.

In the method of forming a Z-section in question, the workpiece 210 is sheet stock; and linear tooling 212 is employed to support the workpiece and to provide surfaces against which the different parts of the section can be formed. The linear tooling consists of two tooling rails 214 and 216 which embrace opposite sides of workpiece 210 with an unsupported edge 217a of the workpiece extending above the tooling and an unsupported leg 217b extending therebelow. The tooling rails are in turn embraced by adapter rails 218 and 220.

The adapter rails 218 and 220 are dimensioned to fit closely within the upper and lower flanges 222 and 224 and 226 and 228 of rear and front clamping rolls 126 and 138, respectively, to vertically locate the adapter rails. This positions the adapter rails vertically in the workpiece guidance system.

the tooling rails fit into recesses 230 and 232 in the adapter rails with shoulders on the adapter rails fitting into cooperating recesses 234 and 236 in the tooling rails. As shown in FIG. 12A, this confines the tooling rails against vertical movement relative to the adapter rails.

The material from which the linear tooling can be fabricated will depend upon the particular application of our novel process. We have successfully employed 1020 mild steel and, in the more demanding applications, the same material hard faced on its workpiece contacting surfaces with Stellite No. 6 alloy and with Stoody No. 6 hard facing arc rod. For applications involving still more stress on the tooling, we have found molybdenum and its alloys such as TZM satisfactory. The tooling can also be made of other refractory metals in demanding applications of the invention.

Mild steel tooling with molybdenum or molybdenum alloy inserts can also be employed as will be discussed hereinafter, and chrome plating having a thickness of 0.001 inch or less can be employed to upgrade the performance of steel tooling.

The first step in forming the Z-section is to displace or bend the unsupported legs 217a and 217b of the workpiece through 90° angles from the positions shown in full lines in FIG. 12A to the positions shown in dotted lines in the same figure. This is accomplished by feeding the workpiece 210 and linear tooling 212 through the machine while heating the workpiece and applying pressure to it with forming rolls 92 and 94 in the manner described above.

The total displacement is accomplished in a series of passes with the forming rolls 92 and 94 being shifted to the left and right, respectively, as shown in FIG. 12A relative to the workpiece in each succeeding pass until, in the final pass, the forming rolls have reached the positions shown in dotted lines in FIG. 12A.

In the final pass, the unsupported legs 217a and 217b of the workpiece lie flat against the upper surface of tooling member 214 and the lower surface of tooling member 216. The workpiece metal has flowed into contact with the upper inner corner of tooling member 214 at the inside of the upper bend and into contact with tooling member 216 and forming electrode 92 at the outside of the bend. Workpiece metal has also flowed into contact with tooling member 216 at the inside of the lower bend and into contact with tooling member 216 and forming electrode 94 at the outside of this bend. This produces contours dictated by the shape of the tooling at the inside of each bend and a near zero radius on the outside of the bend.

In the next step of forming the Z-section, adapter rails 218 and 220 are replaced with the single adapter rail 240 of the configuration shown in FIG. 12B, and the flatfaced forming roll 92 is replaced with one (242) having flat and bevelled face portions 243 and 244. Also, for this step, the lower roll 94 of the machine is elevated to a level where it will lend support to adapter rail 240 during the forming step.

The workpiece is then again fed through the machine in a series of passes with the forming roll 242 being translated to the left in each successive pass until the electrode has reached the position shown in dotted lines in FIG. 12B and the unsupported leg portion 246 of the workpiece has been bent or displaced through a 90° angle and the workpiece metal displaced into the recess 248 in tooling member 214.

Again, as in the first of the forming operations, the inside of the bend between leg portions 217a and 246 will assume the contour of the tooling member; and the outside of the juncture will have a near zero radius.

The final step in forming the Z-section is to reverse the tooling rail and workpiece and form the remaining leg of the section in the manner just described.

A number of Z-sectioned members have been made in the manner just described. In forming these, the tooling and workpiece were pulled through a single stand machine of the type shown in FIGS. 8 and 9 by a hydraulic ram to apply front tension to the workpiece. The forming and support rails were not driven.

The manufacture of a Z-section involves a metal forming operation in accord with the principles of the present invention which we term "bending" and in this particular application "square bending." However, it will be recognized that producing sheet metal components by the novel process just described is quite different from conventional bending. In addition to flexure of the workpiece, our process involves both backward extrusion of the workpiece metal ("backward extrusion" involves flow of the workpiece metal in the direction opposite to that of the squeeze force exerted by the forming tool or tools) and lateral flow of the workpiece metal into contact with the linear tooling member and the forming tool. The result is controlled radii on the outside and inside of the junction between adjacent, angularly disposed portions of the workpiece produced by the forming tool, features of importance for the reasons discussed above.

"Bending" can of course be employed to form shapes other than Z-sections. Angles, channels, etc., can be formed with equal facility. In the latter and other cases both bends can be formed simultaneously by the upper and lower forming tools of machines such as those described above.

Furthermore, non-uniform parts such as Z-sectioned members with a tapered web can be readily made by using tooling of the appropriate configuration. Parts with shapes of this character from sheet metal and plate stock are unique.

The linear tooling members and forming tools illustrated in FIGS. 12A and 12B are merely exemplary of the many forms thereof which may be employed to form "bends" in accord with the principles of the present invention.

An alternate method for forming square bends which has proven to give particularly good results, shown in FIG. 15, employs a flat-faced, rotatable, forming tool 254 and linear tooling rails or members 256 and 258. The top surface of tooling member 256 is spaced below the corresponding surface of tooling member 258 so that the unsupported leg 260 of the workpiece 262 confined between the tooling rails can be "ironed down" onto the upper surface of tooling rail 256.

Insulating members 264 and 266 are fixed to the upper surfaces of tooling rails 256 and 258, respectively. As shown by the arrows in FIG. 15, this eliminates any flow of current between the forming roll 254 and tooling rails 256 and 258, confining the flow of current to the region of the workpiece in which the juncture between legs 260 and 268 is formed.

There are various types of insulation which may be employed for the purposes just discussed. One which has been found satisfactory is fiberglass tape.

Care must be exercised in selecting the squeeze force when insulation is employed on the workpiece contacted faces of the tooling members. Too high a pressure will cause insulation breakdown and current shunting. Too low a pressure will permit interaction between the tooling and workpiece due to local overheating caused by poor electrical contact.

An ancillary step that can in some cases be employed to advantage in applications of the present invention involving the forming of components from sheet metal stock is preforming of the workpiece. Preforming reduces the number of passes through the forming machine required to shape the workpiece to its final configuration.

The preforming step will typically be carried out in a press brake or with cold rolls to displace adjacent sections of the sheet stock to an angular relationship with the radius of the juncture between the displaced sections several times the thickness of the sheet material. In the subsequent forming operation in accord with the principles of the present invention the workpiece is "ironed" onto the tooling to reduce the radius of the juncture and form the component to shape.

The following example illustrates the application of square bending to the formation of an exemplary structural component in accord with the principles of the present invention.

Prototype Z-section stringers were formed from 0.06 inch thick sheets of alpha-beta Ti-6Al-4V and Ti-6Al-6V-2Sn titanium alloys using the forming roll and linear tooling shown in FIG. 12A. The components were formed in four steps, one of the bends adjacent the web of the stringer being formed in each of the first two steps and the other bends being formed in the third and fourth steps.

Two passes were employed to form each bend. In the first, the forming tool was oriented with respect to the unsupported leg of the workpiece as shown in full lines in FIG. 12A. For the second pass, the forming roll was repositioned to the left and at a lower level as shown in dotted lines in FIG. 12A.

The process parameters were as follows:

| | |
|---|---|
| Forming speed: | 10 inches per minute |
| Roll force: | 1,000 pounds (second pass) |
| Workpiece temperature: | 1550–1600° F. |

The resulting components were well within established dimensional tolerances. The internal radii of the bends conformed to the tooling radii (0.01 inch). The radii on the outside of the bends or junctures were also very small.

FIG. 13 is a photomicrograph of a square bend formed in 0.06 inch thick Ti-6Al-4V in accord with the principles of the present invention as discussed above. It can be seen that the internal and external radii of the bend are very small and uniform and, also, that the workpiece metal is gathered at the bend and has been distributed in a streamlined pattern around the bend.

The streamlined microstructure and thickening of the metal in the area of the bend results in a significant improvement in endurance strength over comparable components made by the present technique of machining them from extrusions. Bends as shown in the photomicrograph have withstood ten million vibrations at an equivalent cantilever stress of over 70,000 pounds per square inch without failure. Nominal stress reductions as high as 18 percent have been found attributable to the thickening of the metal in the corners, which can reach 8–10 percent.

Referring again to the drawing, FIG. 14 makes clear the importance of bends with small internal and external radii in titanium alloy Z-sections. Curve 272 shows that a significant reduction in weight can be realized by decreasing the internal and external radii of a bend 274 to the degree uniquely provided by the present invention (the internal radius can be further decreased by shaving or a similar simple operation to take additional advantage of the benefits attributable to small radii as discussed above). Curve 276 shows that an even greater saving in weight (as high as 17 percent) can be realized if, as is also within the capabilities of our process, the bend is made with a square or zero radius outer corner as identified by reference character 278.

The Z-section for which curves 272 and 276 were developed has a faying surface 0.92 inch wide in 0.050 inch thick Ti-6Al-4V.

As shown by curve 272, for a bend of the configuration identified by reference character 274, and employing conventional cold forming as a basis increasingly better results are obtained by conventional hot forming, by hot forming with heated rolls, by forming the bend to a small radius in accord with the present invention (the area of the curve identified by the arrow labelled "ISOTHERMAL METAL WORKING"), and by forming the bend to a zero external radius.

The formation of junctures or bends is by no means limited in application to flat sheets or plates. The same technique may, for example, be readily employed to form radial flanges on a cylinder fabricated from sheet or plate material.

FIG. 16 shows in diagrammatic form an exemplary machine 282 which may be employed for flanging cylinders. This machine differs from those discussed above in one respect by the substitution of a table 284 for the workpiece guidance system discussed previously.

Supported from table 284 by a vertically extending shaft 286 is a rotatable inner tooling member 288. The cylindrical workpiece 290 is confined between tooling member 288 and outer, annular tool member 292 by bolts or other fasteners (not shown) with unsupported edge portions of the cylinder extending both above and below the tooling members.

The machine retains the capability for effecting a closely controlled flow of current through the workpiece between forming rolls 294 and 296 and for causing the latter to exert forces of controlled and selected magnitude on the workpiece.

As the assemblage of tooling members and workpiece is rotated relative to the upper and lower forming rolls 294 and 296, the unsupported upper and lower edges of the workpiece are ironed down onto the outer tooling member at right angles to the cylindrical midsection of the cylinder.

One cylindrical U-section channel was formed by the technique just described from a 0.090 inch thick by 2.5 inch wide band of Ti-6Al-4v that had been rolled and then TIG welded into a 9 inch diameter cylinder.

Bevelled forming rolls (see FIG. 12B) rather than the illustrated flat surfaced forming rolls were employed, and formation of the flanges was completed in four rotations of the workpiece and tooling. The forming rolls were shifted radially outward in equal increments after each rotation of the assemblage.

The following process conditions were employed:

| | |
|---|---|
| Forming speed: | 6.0 inches per minute |
| Roll force: | 1300 pounds |
| Workpiece temperature: | 1750° F. |

The internal radii of the flanges were extremely sharp (less than 0.005 inch), and the workpiece metal back extruded to produce a pronounced square corner and a razor-sharp "flash" on the outside corners of the flanges. There was no evidence of cracking, either in the areas of flange formation or in the weldment. The component had a near-perfect roundness (0.012 TIR), which indicates an extremely low degree of residual stress in the areas in which the flanges were formed.

FIG. 17 is a photograph of a channel-shaped ring formed from 0.080 inch thick Ti-6Al-4V in the manner just described. High quality is again evident.

Temperatures employed for forming components from sheet metal can typically be somewhat lower then those employed in forming barstock of the same material by the techniques which will be described next. We have successfully formed titanium alloy sheets (Ti-6Al-4V and Ti-6Al-6V-2Sn) to internal radii as small as one-fourth of the thickness of the sheet at temperatures as low as 1500°–1550° F., for example. In forming components from barstock of the same alloys forming temperatures as high as 2300° F. have been employed. This freedom in the selection of forming temperatures permits titanium alloys to be worked in the mixed alpha plus beta field, in the beta continuous field with dispersed, undissolved alpha, or in the homogeneous beta field as desired to produce a component with optimal metallurgical and mechanical properties.

Another type of operation which may be carried out in accord with the principles of the present invention is the operation of upsetting one or both edges of a sheet or plate type workpiece to thicken the edge into a selected contour. This may be done simply to produce a thickened edge or to gather at the edge of the workpiece metal which may in a subsequent spreading operation be shaped into a flange, thus permitting sheet and plate stock to be converted into T-sections, I-beams, etc.

In upsetting and spreading the flange of the final component can be made thicker, thinner, or equal in thickness to the parent sheet. This capability is unique.

To illustrate this facet of our invention, the edge of a sheet 300 (see FIG. 18) was upset to produce a member 302 having the cross-sectional configuration shown in FIG. 19. Sheet 300 was of a 0.055 inch thick, nickel-base superalloy (Inconel 718 of approximate composition Ni-19Cr-18Fe-5Cb-3Mo-0.8Ti-0.6Al) and was clamped between mild steel tooling members 304 and 306 having the configuration shown in FIG. 19. The tooling dimensions were:

| | |
|---|---|
| Thickness: | 0.375 inch |
| Recess width: | 0.125 inch |
| Recess depth: | 0.055 inch |

The forming process was carried out in a single pass in a machine of the type discussed above in conjunction with FIGS. 8 and 9 and having flat-faced TZM forming rolls 0.625 inch wide and 8 inches in diameter.

The workpiece and tooling assemblage as passed between the forming rolls of the machine with current programmed to give constant conditions. Forming parameters were:

| | |
|---|---|
| Squeeze force: | 2000 pounds |
| Temperature: | 2100° F. |
| Forming speed: | 5.5 inches per minute |
| Radius formed: | 0.035 to 0.045 inch |

FIG. 20 is a photomicrograph of the thickened edge of the resulting component. Small grain size and streamlining of the microstructure of the metal are both visible in the photomicrograph.

In another test, the upsetting and spreading process was applied to the edge of beryllium sheet. A beryllium sheet 0.062 inch thick was supported between two linear tooling rails. The edge of the sheet was positioned to extend 0.06 inch above the rails. This protruding edge was upset and spread to a section of generally the same configuration as shown in FIG. 20 with a flat-faced forming roll.

The processing parameters were:

| | |
|---|---|
| Squeeze force: | 800 pounds |
| Temperature | 1300° F. estimated |
| Forming speed: | 5.4 inches per minute |

The steps involved in one technique for laterally spreading a thickened workpiece edge to convert the workpiece into an I-beam, a T-section or other flanged component are shown in FIGS. 21A-21C. In this case, to further illustrate the versatility of the process, "spreading" is shown as applied to a workpiece which, in its initial form, was round barstock rather than sheet or plate as in the preceding variation of our process.

Also, in our method as depicted in the foregoing figures, guide rolls as opposed to linear tooling and clamping rolls are employed in the first two steps of the forming operation to direct the workpiece through the forming rolls. This not only eliminates the need for tooling, but also permits indefinite workpiece lengths to be formed; i.e., for the process to be carried out as a continuous operation. This cannot be done with linear tooling because the distance over which forming can be accomplished is limited to the length of the tooling.

The method depicted in FIGS. 21A-C is also amenable to a multi-stage or multi-stand type of operation as far as the first two steps are concerned in that the workpiece may be fed directly from a stand set up as shown in FIG. 21A to a second stand set up as shown in FIG. 21B. This adaptability of our process to both continuous and multi-stand operation is of course highly important from a manufacturing point-of-view.

In the initial step of the process for converting round barstock into I and T-sections shown in FIGS. 21A-21c, the barstock 310 is converted into a dumbbell-sectioned or shaped workpiece 312 by a set-up consisting of upper and lower forming rolls 314 and 316 and lateral guide rolls 318 and 320 mounted for rotation about vertical axes. The set up may be made in a machine of the type discussed above in conjunction with FIGS. 8 and 9.

The forming rolls 314 and 316 have a crowned face 322 with a centrally located arcuate groove 324 matching the external configuration of the barstock formed therein. The grooves 324 in the forming rolls guide the barstock in a rectilinear path through the machine as the forming of the barstock into the dumbbell shape proceeds. Crowned rolls as shown in FIG. 21A and rolls with a bevelled or V-shaped face will in many applications of the invention more efficiently promote the wanted lateral spreading of the workpiece metal than will flat-faced rolls.

As in other applications of our invention, a circuit is completed through the workpiece from one to the other of the two forming electrodes, and pressure is applied by the forming rolls so that the workpiece will become plastic over the localized region contacted by the forming rolls. At the same time, because the workpiece is otherwise cold, the metal in the zone made plastic can flow to only an extremely limited extent in the longitudinal direction. It accordingly spreads laterally as shown in the right-hand portion of FIG. 21A until it engages guide rolls 318 and 320 which limit the lateral flow of the metal, causing it to gather and form thickened edge portions.

FIG. 22 is a photomicrograph of a 1.30 inch wide dumbbell rolled from 0.628 inch diameter Ti-6Al-4V barstock in the manner just described. The maximum thickness of the dumbbell was 0.290 inch, and the minimum thickness was 0.135 inch.

The rolling parameters for forming the dumbbell were as follows:

| | |
|---|---|
| Squeeze force: | 19,200 pounds |
| Current density: | 12,000 amps |
| Drive torque on forming rolls: | 7500 inch-pounds |

A force feed of 4050 pounds acting in the direction of workpiece movement was employed to promote lateral spreading of the workpiece metal, and a nominal front tension of 100 pounds was established to keep the workpiece straight. The front tension was generated by exerting a force acting in the direction of workpiece movement after the workpiece had passed between the forming rolls with a hydraulic ram.

The second step in converting round barstock to an I-beam involves "thinning," which is yet another type of forming operation that may be accomplished in accord with the principles of the present invention. In the thinning step, the midpart of the dumbbell is passed between forming rolls set up as shown in FIG. 21b to reduce the thickness of the midsection and to make the section uniformly thick. As is apparent from the right-hand part of FIG. 21B, this step forms the web of the I-beam to its final configuration.

In the thinning operation, guide rolls 318 and 320 are employed to move the workpiece in the proper rectilinear path through the forming machine and to confine lateral flow of the workpiece metal so that additional metal will gather at the edges of the workpiece. The crown-faced forming rolls 314 and 316 are replaced with flat-faced rolls 326 and 328, and the spacing between the forming and guide rolls is decreased. This also promotes the gathering of metal in the edges of the workpiece.

In this step, also, the flow of the workpiece metal in the plastic zone is primarily lateral, there being very little elongation of the workpiece.

The web of a dumbbell as shown in FIG. 22 was levelled and thinned with flat-faced rolls 1.1 inches wide. A single pass was employed as were the following forming parameters:

| | |
|---|---|
| Squeeze force: | 21,500 pounds |
| Front tension: | 5,800 pounds |
| Amperage: | 11,000 amps |

In one typical example, the width of the workpiece increased from 1.835 inches to 1.903 inches. Before levelling, the web has a minimum thickness of 0.069 inch and a maximum thickness of 0.127 inch. After levelling, the web thickness was between 0.086 and 0.094 inch.

The third and final step in the fabrication of an I-beam by the process shown in FIGS. 21A-C involves forming the flanges of the beam by spreading (i.e., causing lateral flow of) the metal in the thickened edges of the dumbbell shape.

In this step the lateral flow of the workpiece metal is unconstrained. This contrasts with the second type of the forming operation where constraint over the lateral flow of the metal is exercised by guide rolls 318 and 320. Thus, whether side constraint is or is not employed will depend upon the particular goal of the forming operation.

The set-up for this operation (see FIG. 21C) is like that employed in the second step of the operation with linear tooling members 330 and 332 substituted for guide rolls 318 and 320. The linear tooling is preferably employed in this step although it is not critical to its success because it provides a more accurate contour against which the workpiece mtal can flow to form the fillets between the flanges and web of the beam.

To illustrate the spreading operation, the flanges of the dumbbell discussed above were spread after thinning the web by employing the set-up shown in FIG. 21C and the following forming parameters:

| | |
|---|---|
| Roll speed: | 3 inches per minute |
| Roll squeeze force: | 8,500 pounds |
| Feed force: | 3,750 pounds |
| Amperage: | 6,000 amps |

In this particular example, variations in web dimensions outside of established tolerances did occur. These were found to be attributable to inadequacies in the temporary tooling which was employed and not to limitations in the process itself.

FIG. 23 is a photomicrograph of a flange and adjoining web formed by spreading a thickened workpiece edge in accord with the principles of the invention. The workpiece was Ti-6Al-4V plate chemically milled to produce strips 0.05 inch thick with 0.20 inch thick edges.

Tooling of the character hown in FIG. 21C was employed, and the forming roll as 2 inches wide. Two passes through the machine were made.

The force exerted by the forming roll was 12,000 pounds, and the forming temperature was 1650° F.

In the first pass, the 0.20 inch thick edge was reduced to a thickness of 0.072 inch (65 percent reduction) and spread to a width of 0.46 inch. In the second pass, the flange was reduced to a thickness of 0.047 inch (35 percent reduction) and the flange width increased to 0.70 inch.

As mentioned above, the flange forming step completes the conversion of the barstock into an I-beam. If a T-section is wanted instead, the I-beam is split longitudinally.

FIG. 23 is a photomicrograph of an I-beam flange and web formed by the spreading technique just described. The photomicrograph shows remarkably fine grain size resulting from the large deformation and short heating cycle as well as streamlining of the microstructure in the flange and in the junction between the latter and the web.

The foregoing example illustrates yet another ancillary technique which can many times be used to advantage in forming metals in accord with the principles of our invention. This is the chemical milling of available stock into shapes which can then be formed to final shape by our process with a minimum of processing.

In addition to the high quality of the components which can be made, the cost savings realized by forming components from difficult-to-form metals by chemically milling them into appropriately shaped blanks and then spreading or otherwise forming the blank by our process are high. For example, T-sections of alloys such as Ti-6Al-4v can be made by chemical milling and isothermal forming at approximately one-half the cost of making them in the current commercial manner, which is by machining the section from an extrusion.

This method of forming flanges by chemical milling and subsequent isothermal forming is also amenable to being carried out as a continuous process. One set-up which can be employed for this purpose is shown in FIG. 25. It consists of a flatfaced forming roll 336 and forming rolls 338 and 340 mounted for rotation about a horizontal axis and separated by a shim 342 of the same width as the workpiece web. Rolls 338 and 340 guide the workpiece 344 through the machine and, also, form the under side of the cap and the fillets of the T-section.

Typically, force-feeding will be employed to minimize the elongation of the workpiece and promote lateral spreading when the flanges are formed as shown in FIG. 25.

The following set of forming parameters has been employed to form T-sections in one pass from Ti-6Al-4V in the set-up shown in FIG. 25:

| | |
|---|---|
| Squeeze force: | 33,500 pounds |
| Feed force: | 6,250 pounds |
| Amperage: | 20,600 amps |
| Forming speed: | 2 inches per minute |

The workpiece will typically reach a forming temperature between 1600° and 1700° F., and reductions on the order of 80 percent are typically achieved in one pass. A Ti-6Al-4V workpiece 0.260 inch wide and 0.385 inch thick has been spread to a cap 1.60 inches wide by 0.055 inch thick in one pass using the parameters listed above and the set-up of FIG. 25.

The details of the chemical milling step will vary from application-to-application. For this reason and because the chemical milling process is not part of the present invention, the process will not be considered in detail herein. To demonstrate how this step can be carried out, however, a web thickness varying less than 0.006 inch in a 48-inch length of Ti-6Al-4V stock was achieved using an etching solution of 10 percent by volume hydrofluoric acid, 21 percent by volume hydrochloric acid, and the balance tap water. At 140°–150° F. the etching rate was 0.007 inch per minute. Organo ceram maskant 1-2065 was applied by brushing to a thickness of 0.010 inch to limit the etching action to the wanted parts of the stock.

As discussed and demonstrated above, forced feed of the workpiece can be employed to advantage in different applications of the present invention. One such forming operaition is that of converting round barstock into a dumbbell shape. The beneficial effect of force feeding in this operation is a significant increase in per pass reduction of the workpiece as shown in FIG. 24A.

The particular operation from which the data illustrated graphically in this figure were developed involved the forming of a 0.5 inch diameter A70 titanium bar. The rolling parameters are given in the drawing.

A 43 percent reduction in thickness was obtained at a rolling temperature of 1700° F. with no force feed. Even though the rolling temperature was reduced 80° F., the exertion of a 5,000 psi force feed resulted in the percentage of reduction being increased to 78 percent per pass.

Another discovery that has come out of our endeavors is the relationship between roll force, current density through the workpiece, and the percentage of reduction that is obtained. As shown in FIG. 24B, the forming temperature is squeeze force dependent when the squeeze force is low and much less dependent on the squeeze force at higher values of the latter. This is because the resistance to the flow of current from the forming tool to the workpiece decreases to a minimum at the point where the yield strength of the workpiece is reached. Further increases in the squeeze force accordingly do not result in an increase in the current flow to which the forming temperature is proportional.

Curves labelled with percentages of reduction also show that a wide variety range of temperature and squeeze force combinations can be employed to obtain a specified percentage of reduction. This is a feature of self-evident importance from the practical point-of-view.

Another advantage of our invention illustrated graphically in FIG. 24B is that significant percentages of workpiece reduction can be obtained using a wide range of process parameters. Again, this is of obvious utility from the user's viewpoint.

In the tests from wjich the data depicted graphically in FIG. 24B was collected, the workpiece subjected to deformation was 0.5 inch diameter A70 titanium barstock. Squeeze forces of 5,000; 7,000; and 9,000 pounds and heating currents ranging from 3,500 to 7,500 amperes were employed.

The following discussion, intended to further illustrate the many different ways in which the principles of the invention may be employed, is limited to the forming of T-sections, simply for the sake of convenience and not because the techniques which will be discussed are limited in applicability to this particular shape.

The formation of such shapes by a combination of chemical milling and isothermal forming and by splitting an I-beam has been discussed in detail above. Another method for forming a T-section and the tooling employed in that method are shown in FIGS. 26A-26C. In addition to spreading, the formation of the section as shown in these figures involves another fundamental type of operation in accord with our invention — the forward extrusion of a workpiece. It also, like the technique illustrated in FIG. 25, involves an unsymmetrical operation.

For forward extrusion, the tooling (whether linear tooling, rolls, or otherwise) is spaced, relieved, or otherwise configured to form a gap or recess into which the workpiece metal can flow in the direction of applied forming tool force from the plasticized zone of the workpiece, either freely as shown in FIG. 26B, or into contact with a die surface to impart a specific configuration to the workpiece.

As shown in FIGS. 26A-C, the set-up for forming round barstock into a T-section by spreading and forward extrusion will typically include a flat-faced forming roll 346 and tooling rolls 348 and 350 separated by one or more shims 352 to form a gap 354.

The current path is from the forming roll 346 through the workpiece 355 into the tooling rolls 348 and 350, the current following the paths indicated by arrows 356 in FIG. 26A. Squeeze force is exerted on the workpiece in the direction indicated by the arrow 358 in the same Figure.

In the first step of the process, the plastic metal in the forming zone flows into the gap 354 between the tooling rolls; and the barstock is flattened, converting the workpiece to the configuration shown in FIG. 26B; viz., a T-section with a thick but not wide flange. In a second process step, the flange is spread to decrease its thickness and increase its width; and additional metal is extruded into the gap 354 between the tooling rolls to increase the depth of the web.

Materials which have been successfully formed in the manner just described include A70 Ti, Ti-6Al-4V, and T321 stainless steel.

Referring again to the drawing, FIG. 27 is a photomicrograph of a T-section formed in the manner just described, but in one rather than two passes.

The workpiece was ⅝ inch diameter Ti-6Al-4V barstock. The flange of the T-section was 0.095 inch thick and 0.83 inch wide. The width of the flange exceeded the width of the roll (0.725 inch), which accounts for the formation of the bulbous tips on the edges of the flange.

The roll or squeeze force employed to form the section was 8,000 pounds. The forming temperature was 1830° F.

Of particular interest was the excellent surface finish on the final cmponent. This was attributable, in part, to spray coating the workpiece, forming roll, and tooling rails with a dry graphite lubricant prior to forming the workpiece.

The method of forming T-sections, I-beams, and the like just discussed involves a combination of forward extrusion and spreading. Another technique for forming T-sections and the like employing a combination of upsetting and spreading and the tooling involved is shown diagrammatically in FIG. 28. The forming roll has not been shown as it will be of the same flat-face configuration discussed above.

The tooling consists of two linear rails 362 and 364 between which the workpiece 366 is clamped with its unsupported edge 368 extending above the surfaces of the upper tooling members. With current flowing through the workpiece and pressures applied to it by the forming roll, the metal in the zone 369 below the forming roll identified by hatching becomes plastic and moves downwardly and laterally to form flanges between the tooling members and the roll. The unsupported depth of the workkpiece will typically be limited to ensure that the unsupported edge of the workpiece will behave as a short column and upset rather than buckle as might occur if more of the workpiece were unsupported.

More than one pass may be employed to spread the workpiece metal to its full width. In an exemplary pass, the flange will spread from the configuration shown in full lines in FIG. 28 to that shown in dotted lines.

It is important, in upsetting and spreading metal by the technique just described, that the center of heat not be allowed to move below the flange. Otherwise, unwanted upsetting will occur in the web or stem of the component, causing defects such as lapping and cold shuts.

FIG. 29 is a photograph of an I-beam made from 0.04 inch thick Ti-6Al-4V sheet by the upsetting and spreading process just described. The tooling used in forming the beam consisted of two members each separated from the workpiece by eight 0.120 inch thick shims. One shim was removed after each pass through the forming rolls to accommodate the decrease in web height which occurred.

The forming parameters were as follows:

| | |
|---|---|
| Forming speed: | 10 inches per minute |
| Squeeze force: | 1,200 lbs. |
| Forming temperature: | 1600–1650° F. |

The flanges of the beam were 0.65 inch wide and 0.50 inch thick. As can be seen from FIG. 29, the beam was dimensionally uniform and had an excellent surface finish.

In those embodiments of the invention so far described which utilize linear tooling. The tooling rails employed to support the workpiece and to provide surfaces against which the metal can flow have been unitary or one-piece members. This is, however, by no means essential in the practice of the present invention.

FIG. 30, for example, illustrates a set-up 370 for isothermally forming a Y-section from round barstock in which the tooling rails 372 and 374 support refractory metal inserts 376 and 378 against which the component is actually formed.

This type of tooling provides the advantages of tooling rails made entirely from a refractory metal but at a much lower cost because the bulk of the tooling is of a low cost material such as mild steel. Replacement costs are also lower. When the tooling becomes too worn to maintain tolerances within acceptable limits it is necessary to replace only inserts 376 and 378, not the entire tooling rails.

The process of forming a Y-section from round barstock with the set-up shown in FIG. 30 is illustrated in flow diagram form in FIG. 31. It involves spreading the metal of workpiece 379 along the upper surfaces of inserts 376 and 378 to form two legs of the section and forward extrusion of the workpiece metal into the gap 380 between the inserts to form the third leg. In a second pass, the three legs of the section are reduced to uniform size.

In subsequent two-step operations the thickness of the legs of the component may be further reduced until, at the end of six passes, a 0.56 inch diameter bar will typically be reduced to a symmetrical Y-section having three 0.045 inch thick legs each about 1.3 inches wide.

The section can be used in this configuration or, as will by now be obvious to the reader, can be readily converted to a T-section by isothermally bending two of the legs until they lie in the same plane.

Referring again to FIG. 30, the two linear tooling rails 372 and 374 are separated by a spacer 382 to provide the gap 380 for the forward extrusion of the workpiece metal. Vertical alignment of the two rails is assured by laterally extending pins 384 (only one of which is shown) spaced longitudinally along the rails.

The refractory metal inserts 376 and 378 are secured in any convenient manner in recesses 386 and 388 formed in the upper levels of the tooling rails.

The assemblage of the linear tooling just described and the workpiece 379 is guided through the machine by front and rear clamping rolls 390 and 392 in the manner described previously with the lower forming roll 394 of the machine being employed to help vertically position the assemblage.

An upper forming roll 396 having a V-shaped face is employed. Pressure is applied to the workpiece and a flow of electrical current through the workpiece is effected as in the other embodiments of our invention.

As shown by FIG. 31, the first pass through the machine reduces the round workpiece 379 to a generally Y-sectioned member having two relatively thin legs A and B formed by spreading and a third, thicker leg C formed by forward extrusion.

The next step in the operation is to reset the gap between the tooling rails, rotate the workpiece 120° as shown in FIG. 31, reassemble it between the tooling, and feed the workpiece through the forming machine. This reduces leg C to the same thickness as legs A and B.

Reduction of the leg thickness can be accomplished in a two-step operation and repeated, if desired, to obtain maximum thinning of the legs.

In the first step of the thinning operation, legs A and C of the workpiece are thinned to reduce them in thickness. Then, as the initial sequence, the gap between the tooling rails is reduced, the workpiece rotated 120°, and the forming pass repeated. At the end of the second pass, the legs will be again of the same, albeit a reduced, thickness as in the last shape in FIG. 31.

For the sake of convenience in developing the principles of the present invention the discussion has so far been limited to the production of shapes of relatively simple configuration. Isothermal metal working or forming can, however, be used with equal facility to produce more complicated shapes. FIGS. 32A and 32B, for example, show how rectangular barstock can be converted to an E-section in two steps employing our process.

Referring now to FIGS. 32A and 32B, in the first step of the illustrated method for forming an E-section, the barstock 400 is passed between a flat-faced lower roll 402, which serves as a workpiece support and electrode, and a forming roll 404 having a groove 406 extending around the center of its periphery. This groove is configured to match the center leg of the ultimate component and to produce fillets between the center leg and web of the section.

In the first pass, the center leg 408 of the section is formed by backward extrusion. Spreading also occurs, thinning the web 410 of the component to its final thickness and gathering the displaced metal in thickened edges 412 of the workpiece.

In the second step of forming the section, the thickened workpiece edges are spread to form the outer legs 414 and 415 of the component.

In this second step the workpiece is confined between tooling members 416 and 418 with the latter being contoured to match the already formed portion of the workpiece. As shown in FIG. 32B, the upper and lower surfaces of tooling rail 416 are spaced above and below the corresponding surfaces of tooling rail 418.

Flat faced forming rolls 420 and 422 are employed in the spreading operation. With these rolls abutting the horizontal surfaces of tooling rail 416, the offset arrangement just discussed leaves gaps 424 and 426 between tooling rail 418 and the forming rolls into which the workpiece metal can flow to form the outer legs 414 and 415 of the section (this is shown at the righthand side of FIG. 32B). This results in junctures between the legs and web 410 of the section which have small internal radii of controlled dimensions. The outside radii of the junctures are essentially zero or square, producing the advantages discussed above.

The utility of the novel process just described was demonstrated with Inconel 718. In one pass, a 0.20 inch thick plate of this material was formed to a 0.108 inch thickness with a maximum variation of 0.006 inch. The back extruded center leg was 0.20 inch wide and 0.205 inch in height with a maximum variation of 0.005 inch.

T and similar sections have been made from a variety of materials including those described above and the extremely difficult to work alloy Hastelloy X. One such section was successfully formed in six passes through a machine as shown in FIGS. 8 and 9 equipped with 12 inch diameter, 1.1 inch wide, flat faced TZM alloy forming rolls and linear tooling similar to that shown in FIG. 28. Each tooling member consisted of three 0.35 inch by one inch TZM bars bolted together.

The forming speed was 4.03 inches per minute for the first five passes and 3 inches per minute in the sixth pass. The remainder of the process parameters and the dimensions of the workpiece after each pass are tabulated in the following table:

In some applications it is not necessary to heat the workpiece across the entire section to the point that it becomes plastic. In such cases, the cooler parts of the section also promote the desired lateral flow of the workpiece metal.

Referring again to the drawing, FIGS. 33–36 show the apparatus employed and steps involved in forming a component with a still more complicated shape; viz., a turbine compressor blade.

The formation of this component also involves two additional types of forming operations within the ambit of our invention — isothermal forging and isothermal roll forging or contour rolling.

Isothermal roll forging is a forming process which has completely different characteristics than the conventional roll forging or "knuckle rolling" heretofore used to make compressor blades and the like. The latter process, typically performed cold, requires that the workpiece be heat treated to a soft condition (preferably in the Rockwell B scale of hardness) before it is formed. Annealing is required after each forming pass because of the work hardening.

As many as eight passes may be required to form a component such as a compressor blade from an easily worked alloy such as 410 steel and eleven or more passes to form such components from more difficult-to-work austenitic steels such as 17-4PH. This necessity of employing plural passes tends to make such knuckle rolled components almost prohibitively expensive because each pass requires application of lubricant, removal of lubricant, and annealing.

If the knuckle rolling process is performed at an elevated temperature, surface contamination, workpiece chilling, and the other problems associated with conventional hot forming discussed above come to the front. One of particular importance in forming components such as compressor blades is the limitation on the thinness to which the edges can be formed. Because of this, knuckle rolling cannot be employed to form configurations such as the knifelike trailing edges of compressor blades, for example.

The disadvantages just discussed are eliminated in isothermal roll forging. Massive amounts of reduction to extreme thinnesses can be obtained. The workpiece

| Pass | Roll Squeeze (lbs) | Clamp Force (lbs) | Current (amps) | Feed Force (lbs) | Cap Dimensions After Each Pass (Inch) | | Reduction of Thickness Per Pass |
|---|---|---|---|---|---|---|---|
| | | | | | Width | Thickness | |
| Original Configuration | — | — | — | | 0.265 | 0.215 | — |
| 1 | 8,500 | 17,500 | 4,000 | 3750 | 0.290 | 0.181 | 15.8 |
| 2 | 20,500 | 20,000 | 8,000 | 5600 | 0.395 | 0.133 | 26.5 |
| 3 | 21,500 | 22,000 | 11,000 | 3750 | 0.542 | 0.095 | 28.6 |
| 4 | 21,500 | 22,000 | 12,000 | 3750 | 0.705 | 0.063 | 33.7 |
| 5 | 21,500 | 22,000 | 12,000 | 2500 | 0.830 | 0.050 | 20.6 |
| 6 | 25,500 | 22,000 | 12,500 | 1250 | 0.942 | 0.045 | 10.0 |

An important attribute of our invention in operations such as forward and backward extrusion as well as spreading is that the desired lateral flow of the metal is promoted while unwanted elongation of the workpiece is held to a minimum. The factors which operate to prevent elongation and promote lateral flow are: (1) the compressive back force generated by employing force feeding; (2) the large reductions per pass; (3) a large diameter forming roll; (4) the relatively low friction between the forming tool and the workpiece; and (5) the existence of cool, non-plastic metal ahead of and beyond the plastic zone.

remains at elevated temperature for only a short period of time as in other forming operations involving the principles of our invention so that the problems associated with conventional hot forming processes are eliminated.

As a corollary, the workpiece is typically not work hardened when formed by our isothermal metal forming process. Accordingly, in contrast to other multiple pass metal forming processes such as knucle rolling, there is no need to anneal the workpiece between forming passes.

As shown in FIG. 33, isothermal roll forging can be carried out in apparatus of the character described above in conjunction with FIGS. 8, 9 and 11. In isothermal roll forging, the forming roll is converted into a die by sculpting the configuration which it is desired to impart to the workpiece into the face of the forming roll. The die cavity may extend partially or even completely around the forming roll, depending upon the configuration wanted in the final component.

In FIG. 33, the forming rolls are identified by reference characters 430 and 432 and the recesses into which the workpiece metal flows to alter its configuration by reference characters 434 and 436. Current flows from power supply 438 through forming roll 430 and workpiece 440 into forming roll 432, and pressure is applied to the workpiece as indicated by arrows 442 and 443. The detector 444 and process controller 446 regulate the current flowing from power supply 438 through the workpiece as discussed above in conjunction with FIG. 10 to maintain the requisite forming temperature.

To form the workpiece to the selected configuration, the workpiece is assembled between the forming rolls as shown in FIG. 33, the current flow initiated, and the pressure applied. The two forming rolls are then rocked in unison in the directions indicated by arrows 447 and 448, again at speeds having magnitudes measured in inches per minute. This moves the workpiece downward as shown in FIG. 33 so that successive regions of the workpiece become plastic, allowing the metal to flow into contact with successive portions of the die surfaces to shape the component to the specified configuration.

The manufacture of turbine blades is one application in which isothermal roll forging can be employed to advantage. In forming a compressor blade, the airfoil section of the blade is formed by isothermal roll forging; and isothermal forging with anvil dies, also mentioned above, is utilized to shape the root section of the blade.

Isothermal anvil or press forging can be employed to particular advantage when relatively heavy sections are to be formed though this is by no means the only instance when advantage can be taken of this particular technique.

FIG. 34 shows apparatus 452 for carrying out the anvil forging process. This apparatus includes upper and lower forming anvils 454 and 456 with recesses or die cavities 458 and 460 of the configuration to be imparted to the workpiece 462 sculpted into their opposite faces. The anvils are connected to the opposite sides of a power supply 464 so that electrical current can flow through the workpiece during the forming operation to elevate its temperature. A detector 466 coupled to a power controller 468 regulates the current density as described previously to keep the forming temperature at the requisite level.

Hydraulic rams (not shown) or other devices are employed to bias the two forming anvils towards each other as shown by arrows 470 and 472 and thereby maintain a force of selected magnitude on the workpiece.

With heat and pressure applied, the workpiece becomes plastic, and the workpiece metal flows into contact with the die surfaces to impart the selected configuration to the workpiece.

Isothermal anvil forging has the advantage common to other techniques within the ambit of our invention that large amounts of deformation and beneficial microstructures can be obtained. Surface oxidation of the workpiece may occur, but this disadvantage is offset by the capability of the process to form complex shapes.

Referring now to the drawing, FIG. 35 shows the steps employed to form a turbine compressor blade from barstock by a combination of the isothermal roll forging and isothermal anvil forging techniques just discussed.

In the initial step of the operation, barstock is formed into the shape shown at the left-hand side of the Figure. Because of the relatively massive section involved, hot upsetting can be employed for this step.

The workpiece 476 is then disposed between the forming rolls 478 and 480 of the isothermal roll forging machine; the circuit is completed through the workpiece across the forming rolls; and the forming rolls are biased toward each other (although not rotated). This results in the workpiece metal becoming plastic and flowing into the root section cavities 482 and 484 of the roll to form what will become the root 486 of the blade approximately to shape (this will be recognized as an example of isothermal anvil forging).

The two forming rolls are then rotated in unison in the directions indicated by arrows 488 and 490 to isothermal roll forge the airfoil section of the blade. Here, a relatively small microvolume of the workpiece becomes plastic with the plastic region moving along the workpiece so that the latter remains at an elevated temperature in any region for only a short period of time. As explained above, the workpiece metal in the plastic zone flows into contact with the surfaces of the die cavities in the forming rolls to impart the selected configuration to the airfoil section of the blade.

The third step of the process is to form the root of the turbine blade to its final configuration (this step is optional and is used only where the desired degree of precision has not been attained in the first two steps). In the illustrated process, this optional third step is also carried out by isothermal anvil forging. An upper anvil 492 and a lower anvil 494 are employed.

A cavity 496 is formed in the lower forming anvil. The lower part of the cavity is configured to match the airfoil shape of the blade and locate the blade relative to the die. The upper part of the die cavity has the shape which is to be imparted to the root of the turbine blade.

With the workpiece between the anvils as shown, the anvils are connected to opposite sides of an electrical power source to effect a flow of current through the workpiece. The upper anvil is displaced toward the lower one with a force of specified magnitude, making the metal in the root area plastic so that it will flow into contact with the die cavity surfaces, shaping the root into the configuration shown in the lower righthand corner of FIG. 35.

The final steps of the blade making process are to twist the airfoil section of the blade to shape and trim, clean, or otherwise finish the blade as required.

In one representative operation, apparatus of the character described above and illustrated in FIG. 33 was employed to make a simulated compressor blade from a Ti-6Al-4V alloy blank previously prepared by isothermal metalworking and machining from a dumbbell shape as illustrated in FIG. 22.

In the initial part of the forming operation, the root of the blade was isothermally anvil forged under the following conditions:

Force: Increased up to 17,500 pounds over 30 seconds

Amperage: Increased up to 12,900 amps over 30 seconds

Forming Temperature (estimated): 1775° F.

The forming rolls were not rotated during this 30 second anvil forging operation.

At the end of the thirty seconds, isothermal roll forging of the blade airfoil was begun by rotating the rolls between which the root section was forged. The following roll forging conditions were employed.

| | |
|---|---|
| Roll squeeze force: | 17,500 pounds |
| Amperage: | 12,900 pounds |
| Roll speed: | 3.3 inches per minute |
| Forming temperature (estimated): | 1775° F. |

The initial blank had a root section 1.0 inch wide with a generally oval cross section 0.36 inch wide and 0.3 inch deep. The airfoil section of the blank was 1.0 inch long, 0.7 inch wide, and 0.10 inch thick.

After roll forging the blade was 3.0 inch long. The airfoil section was 0.64 inch wide. It had a maximum thickness of 0.05 inch, tapering to flash approximately 0.001 inch thick at its leading and trailing edges.

To further demonstrate the versatility of isothermal roll forging, airfoil shapes having one flat and one contoured surface were formed, employing one forming roll with a flat face and a second forming roll with an arcuate contour. These contours were obtained by attaching dies of forged TZM alloy to the upper and lower rolls of a machine as shown in FIGS. 8 and 9.

The dies were 0.57 inch thick, 1 inch wide, and 4 inches in length measured along the arc. The face of one die was flat. The face of the other was machined to a circular contour having a width of 0.80 inch. This left 0.1 inch wide flats on each side of the die cavity.

Round Ti-6Al-4V barstock 0.315 inch in diameter was fed between the rotating dies with the feed force of 1,250 pounds. A squeeze force of 21,500 pounds was generated, and the dies were rotated in unison at a speed of 3.3 inches per minute. A current through the workpiece of 11,500 amps was employed, causing the forming temperature to reach as estimated 1,675° F.

One pass through the die produced an airfoil shape 0.77 inch wide. The midsection of the airfoil had a 0.063 inch maximum thickness, and the leading and trailing edges of the airfoil were 0.008 inch thick.

After a second pass through the dies with the conditions the same except for the elimination of the feed force, the airfoil reached the full die cavity width of 0.8 inch. The midsection thickness was reduced to 0.053 inch, and the leading and trailing edges were thinned to a 0.001 inch thick flash.

The surface finish of the airfoil replicated the surface finish of the dies and was an excellent 16 rms. A metallographic examination of the airfoil at 500X magnification revealed no evidence of any contamination in the completed component.

In another instance, a 0.315 inch diameter bar of 17-4PH steel (Fe-16.5Cr-4Ni-4Cu-0.3Cb + Ta) was formed to an airfoil in the manner just described. The process conditions were:

| | |
|---|---|
| Squeeze force: | 21,500 pounds |
| Feed force: | 1,250 pounds |
| Forming speed: | 3.3 inches per minute |
| Amperage: | 11,800 amps |
| Forming temperature: (estimated) | 2,000° F. |

A single pass formed the stock into an airfoil shape. The component was 0.8 inch wide and 0.066 inch thick at the maximum dimension. The leading and trailing edges of the section were 0.014 inch thick.

Again, the surface and metallographic characteristics of the airfoil were excellent.

In a similar test designed to demonstrate the applicability of isothermal roll forging to extremely difficult-to-work metals, round 0.350 inch diameter Rene' 95 alloy was shaped into an airfoil section from barstock using the technique to form airfoils from Ti-6Al-4V and 17-4PH steel just described. The rolling conditions were:

| | |
|---|---|
| Squeeze force: | 21,500 pounds |
| Feed force: | 2,000 pounds |
| Forming speed: | 1.7 inches per minute |
| Amperage: | 13,000 amps |
| Forming temperature: | 2,050° F. |

In one pass, the round barstock was reduced to an airfoil section 0.90 inches wide with a maximum thickness of 0.090 inch and leading and trailing edges having a thickness of 0.016 inch.

In both this case and that of the 17-4PH steel, a second pass would have resulted in an airfoil with dimensions comparable to those obtained by the second pass of the Ti-6Al-4V airfoil through the forming dies.

Other metals that have been formed into airfoils by the technique just described with the same superior results include the superalloy Inconel 718, Mar-M-421, and Hastelloy X. Reductions of 70–90 percent per pass were obtained in each instance.

FIG. 36 is a photomicrograph of a section through an airfoil formed from Ti-6Al-4V barstock in the manner just described. Surface contamination is absent; and, as indicated above and shown in the photomicrograph, the surface finish of the as-rolled airfoil was excellent.

FIG. 37 is a photomicrograph through a compressor blade root section formed from Ti-6Al-4V stock by isothermal press or anvil forging. Again, excellent dimensional control, surface finish, and metallographic properties are prominent.

In the exemplary embodiments of the invention so far described, only two forming rolls or tools have been employed. The number of forming tools can be increased to reduce the number of operations needed to form a given shape or to form shapes which are more complicated than those which can be readily handled by two rolls.

Refering again to the drawing, FIG. 38 shows, diagrammatically, apparatus 500 for forming Y-sections by a technique in accord with our invention which employs more than two forming tools. The process is also of continuous character, further illustrating the amenability to continuous operation possessed by our process.

Forming apparatus 500 includes three equidistantly spaced refractory metal forming rolls 502, 504, and 506 with beveled faces 508. The rolls are rotatable about axes lying in the same plane and at angles of 120° to each other.

Hydraulic rams or the like (not shown) are employed to bias the forming rolls toward the line at which the apices of the beveled faces intersect and exert the requisite squeeze force on the workpiece 510.

As in the other machines discussed above, the forming rolls are also electrodes across which an electrical circuit can be completed to effect a flow of current through the workpiece and thereby heat it. In this case, each of the rolls is connected to one leg of a three-phase power supply 511 so that the current will flow simultaneously between each of the three forming roll pairs 502, 504; 502, 506; and 504, 506.

A feedback type control system (not shown) will typically be employed to precisely regulate the current flowing through the workpiece.

As the workpiece 510 moves through the forming rolls, it becomes plastic; and the metal spreads into the gaps 512, 514, and 516 between the forming rolls, converting the barstock to a a Y-shape as shown in FIG. 38.

Force feeding of the workpiece will typically be employed in applications of the character just described because of the large amount of reduction and the large lateral displacements of the workpiece metal involved.

Another advantage of our invention, also important from a production-point-of-view and discussed above, is that it is readily amenable to multi-stage (or multi-stand) processing. One example of such processing was described in conjunction with FIGS. 21A and 21B, it being pointed out that the dumbbell forming and web thinning and levelling operations shown in these two figures could be performed on a continuous basis in two isothermal metal forming set-ups disposed in tandem.

FIGS. 39A and 39B depict, diagrammatically, another example of continuous, multi-stage isothermal metal forging; viz., the conversion of round barstock into an I-beam on a continuous basis in two stands disposed in tandem.

In the first stand (FIG. 39A), the workpiece is guided between upper and lower forming rolls 517 and 518 by guide rolls 519 and 520 to effect lateral spreading and gathering of the workpiece metal at opposite edges of a web section.

In the second operation, carried out in a stand immediately following that just described (See FIG. 39B), the metal in the thickened edges of the shape is spread laterally into flanges, again on a continuous basis. In this operation, the workpiece 522 is guided between upper and lower forming rolls 524 and 526 by guide rolls 528 and 530 having a width equal to the height wanted in the finished I-section and corners contoured to form fillets between the webs and flanges of the section. The particular technique involved in this step; viz., the spreading of a thickened edge into a wider, narrow flange, has been discussed above.

In multi-stage operation, independent control of the forming temperatures (and preheat, if employed) at each forming stand will typically be required. A detector and feedback control arrangement as described above can be employed at each stand to achieve such control.

To eliminate the flow of current between stands through the workpiece and the undesirable workpiece heating which could result therefrom, one stand can be grounded and a second floated electrically above ground potential. This permits the forming rolls of the first stand to be maintained at the same potential as the preheat rolls of the second stand. Thus, there is a potential gradient and current flow within the components only at each of the two stands.

As an alternative, the voltage can be alternately stepped up and down at each successive stand, thus avoiding large voltage differences. This scheme has the advantage of being adaptable to a larger number of stands.

Another problem which would at first blush be thought to exist is that of synchronizing the forming speed of the rolls in succeeding stands to the velocity of the workpiece exiting from the preceding stand. This problem proves to be minimal because an inherent characteristic of isothermal metal forming, discussed above, is the small axial elongation of the workpiece.

Furthermore, if a lubricant such as those discussed above is employed, sufficient slippage between the forming rolls and workpiece to accommodate small differences in velocity will occur.

As a result, in all but the most exceptional cases, the different stands can be driven at the same speeds by any suitable drive arrangement. This of course does not mean that the forming rolls cannot be driven at different speeds in succeeding stands where it is beneficial to do so. We consider this alternative to be clearly within the scope of our invention.

In operations involving the forming of components from sheet metal or thin plate stock, the application of back compression forces to the workpiece between stands will typically not be required. In applications where it is, such as in the typical forming of a component from barstock, the compressive force may be applied between stands by employing force feeding rolls such as those incorporated in the machine illustrated in FIG. 11.

Another necessity in a multi-stage operation is a system for applying lubricant to the workpiece between forming operations. It is not considered necessary to describe such systems herein as they can be readily devised by those skilled in the arts to which this invention relates.

As will be apparent to those skilled in the relevant arts from the foregoing text, there are inumerable applications and adaptations of the principles of our invention of which advantage can on occasion be taken. To the extent that these embodiments of our invention have not been expressly excluded from the appended claims, they are fully intended to be embraced therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for the solid state forming of a metallic workpiece into a component of selected configuration, comprising: a rotatable, pressure applying electrode fabricated of a refractory metal; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for heating both said workpiece in that region thereof between the pressure applying electrode and the workpiece supporting means and that portion of the electrode contiguous to the workpiece and for impeding the flow of heat away from said heated portion of said electrode to keep said electrode from chilling said workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; means for effecting a translation of the workpiece relative to the pressure applying electrode and the workpiece supporting means to thereby cause the zone in which the plastic condition exists to proceed along the workpiece; and means including rotatable guide members disposed at intervals along the path of movement of the workpiece and on opposite sides thereof for guiding said workpiece as it is translated relative to said pressure applying electrode.

2. The apparatus of claim 1, wherein said guide members are directly engageable with said workpiece to thereby make said apparatus capable of forming workpieces of indefinite length.

3. The apparatus of claim 1, together with means for adjustably displacing those rotatable guide members on one side of the path of workpiece movement toward and away from said path.

4. The apparatus of claim 1, wherein said guide members are rectilinearly movable in directions toward and away from said working supporting means.

5. The apparatus of claim 1, together with means for biasing the rotatable members on one side of said path of workpiece movement against said workpiece with forces of selected magnitude.

6. The apparatus of claim 1, wherein said pressure applying electrode has a peripheral portion engageable with the workpiece, said peripheral portion having at least one cavity into which the workpiece metal can flow to thereby impart a selected configuration to said workpiece.

7. In apparatus for forming a metallic workpiece into a component of selected configuration by effecting lateral spreading of the workpiece metal and comprising: a rotatable, pressure applying electrode fabricated of a refractory metal; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for heating both said workpiece in that region thereof between the pressure applying electrode and the workpiece supporting means and that portion of the electrode contiguous to the workpiece and for impeding the flow of heat away from said heated portion of said electrode to keep said electrode from chilling said workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; and means for effecting a translation of the workpiece relative to the pressure applying electrode and the workpiece supporting means to thereby cause the zone in which the plastic condition exists to proceed along the workpiece; wherein the pressure applying electrode has a bevelled or crowned peripheral configuration to promote the lateral flow of workpiece metal.

8. The apparatus of claim 7, wherein there is a set of three or more electrodes through which the workpiece can be displaced to form it into said component of selected configuration.

9. The apparatus of claim 8, wherein said workpiece supporting means is comprised of at least one of the electrodes in said set thereof.

10. The apparatus of claim 7, together with rotatably mounted members on opposite sides of the path of workpiece movement at the location where the plastic condition exists for limiting the lateral flow of the workpiece metal.

11. Apparatus for the solid state forming of a metallic workpiece into a component of selected configuration, comprising: a rotatable, pressure applying electrode fabricated of a refractory metal and having a peripheral portion engageable with the workpiece, said peripheral portion having at least one cavity into which the workpiece metal can flow to thereby impart a selected configuration to said workpiece; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for heating both said workpiece in that region thereof between the pressure applying electrode and the workpiece supporting means and that portion of the electrode contiguous to the workpiece and for impeding the flow of heat away from said heated portion of said electrode to keep said electrode from chilling said workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; and means for effecting a translation of the workpiece relative to the pressure applying electrode and the workpiece supporting means to thereby cause the zone in which the plastic condition exists to proceed along the workpiece and the metal in said workpiece to flow into the cavity in the rotatable electrode to thereby impart said selected configuration to said workpiece.

12. The apparatus of claim 11, wherein the cavity in the rotatable electrode extends completely around the periphery thereof.

13. The apparatus of claim 11, wherein the workpiece supporting means is a second electrode mounted for rotation about an axis parallel to the axis of rotation of the pressure applying electrode and wherein the second electrode also has a peripheral, workpiece engageable portion with a cavity formed therein whereby, as said workpiece is translated relative to said pressure applying electrode, substantially the entire external configuration of the workpiece can be altered.

14. The apparatus of claim 11, wherein there are cavities as aforesaid in and opening onto the workpiece engageable surfaces of both said pressure applying electrode and said workpiece supporting means.

15. Multi-stand apparatus for the solid state forming of a metallic workpiece into a component of selected configuration, comprising: a plurality of forming stands disposed so that the workpiece can proceed from one of said stands after having been formed therein to the next of said stands for further forming, there being at each of said stands: a rotatable, pressure applying electrode fabricated of a refractory metal; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for heating both said workpiece in that region thereof between the pressure applying electrode and the workpiece supporting means and that portion of the electrode contiguous to the workpiece and for impeding the flow of heat away from said heated portion of said electrode to keep said electrode from chilling said workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; and means for effecting a translation of the workpiece relative to the pressure applying electrode and the workpiece supporting means to thereby cause the zone in which the plastic condition exists to proceed along the workpiece.

16. The apparatus of claim 15, wherein there is, at at least one of said forming stands, a set of three or more electrodes through which the workpiece can be displaced to impart a selected configuration thereto.

17. The apparatus of claim 16, wherein the workpiece supporting means at each stand at which there is a set of three or more electrodes as aforesaid is at least in part comprised of at least one of the electrodes in said set thereof.

18. The apparatus of claim 15, wherein there is, at at least one of said forming stands, means including rotatable guide members disposed at intervals along the path of movement of the workpiece and on opposite sides thereof for guiding said workpiece as it is translated relative to said pressure applying electrode.

19. The apparatus of claim 15, wherein, at at least one of said forming stands, the pressure applying electrode has a bevelled or crowned peripheral configuration to promote the lateral flow of workpiece metal.

20. The apparatus of claim 15, wherein, at at least one of said forming stands, the pressure applying electrode has a peripheral portion engageable with the workpiece, said peripheral portion having at least one cavity into which the workpiece metal can flow to thereby impart a selected configuration to said workpiece.

21. The apparatus of claim 15, wherein there are, at at least one of said forming stands, rotatably mounted members on opposite sides of the path of workpiece movement at the location where the plastic condition exists for limiting the lateral flow of the workpiece metal.

22. Apparatus for the solid state forming of a metallic workpiece into a component of selected configuration, comprising: a rotatable, pressure applying electrode fabricated of a refractory metal; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for heating both said workpiece in that region thereof between the pressure applying electrode and the workpiece supporting means and that portion of the electrode contiguous to the workpiece and for impeding the flow of heat away from said heated portion of said electrode to keep said electrode from chilling said workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; means for effecting a translation of the workpiece relative to the pressure applying electrode and the workpiece supporting means to thereby cause the zone in which the plastic condition exists to proceed along the workpiece; and rotatably mounted members on opposite sides of the path of workpiece movement at the location where the plastic condition exists for limiting the lateral flow of the workpiece metal.

* * * * *

UNITED STATES PATENT OFFICE
CERTIFICATE OF CORRECTION

Patent No. 3,988,913         Dated November 2, 1976

Inventor(s) Arthur G. Metcalfe    Fred K. Rose    Page 1 of 2

It is certified that error appears in the above-identified patent and that said Letters Patent are hereby corrected as shown below:

column 1, line 6, change "3,944,782" to --3,944,872--.

Column 2, line 2, change "1975" to --1957--.

Column 3, line 50, change "workpieces" to --workpiece--.

Column 9, change lines 2 and 3 to read:

--tool through the workpiece to a workpiece support;

15.   which are capable of reducing the metal loss by re- --.

Column 10, line 20, change "an" to --and--.

Column 17, line 11, change "thos" to --those--.

Column 17, line 57, insert --bus-- before "bar".

Column 20, line 13, change "176a and 176a" to --176a and 176b--.

Column 21, line 27, change "204a and 240b" to --204a and 204b--.

Column 22, line  3, change "the" to --The--.

Column 24, line 15, change "the" to --The--.

Column 28, line 60, change "tomove" to --to move--.

Column 29, line 38, change "mtal" to --metal--.

UNITED STATES PATENT OFFICE
CERTIFICATE OF CORRECTION

Patent No. 3,988,913                    Dated November 2, 1976

Inventor(s)    Arthur Metcalfe     Fred K. Rose

It is certified that error appears in the above-identified patent and that said Letters Patent are hereby corrected as shown below:

Page 2 of 2

Column 29, line 62, change "hown" to --shown--.

Column 29, line 63, change "as" to --was--.

Column 31, line 13, change "operaition" to --operation--.

Column 31, line 51, change "wjich" to --which--.

Column 37, line 17, change "The" to --A--.

Column 41, line 21, delete the first "a".

Signed and Sealed this

Fifth Day of April 1977

[SEAL]

Attest:

RUTH C. MASON
Attesting Officer

C. MARSHALL DANN
Commissioner of Patents and Trademarks